(12) United States Patent
Boysworth

(10) Patent No.: US 6,961,677 B1
(45) Date of Patent: Nov. 1, 2005

(54) METHOD AND APPARATUS FOR CATEGORIZING UNEXPLAINED RESIDUALS

(75) Inventor: Marc Kenneth Boysworth, Alexandria, VA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 64 days.

(21) Appl. No.: 10/646,774

(22) Filed: Aug. 25, 2003

(51) Int. Cl.[7] .............................................. G06F 11/34
(52) U.S. Cl. ...................................... 702/189; 702/183
(58) Field of Search ........................... 702/84, 104, 183, 702/189–191, 196; 700/29, 33, 44, 38; 708/300; 73/2, 7; 706/14, 24, 33, 52

(56) References Cited

U.S. PATENT DOCUMENTS

| | | | | |
|---|---|---|---|---|
| 4,845,500 A | * | 7/1989 | Cornett et al. ................. | 342/90 |
| 5,805,447 A | * | 9/1998 | Teng et al. .................... | 700/37 |
| 5,864,773 A | * | 1/1999 | Barna et al. .................. | 702/85 |
| 6,202,033 B1 | * | 3/2001 | Lange ......................... | 702/104 |
| 6,249,755 B1 | * | 6/2001 | Yemini et al. ............... | 702/183 |
| 6,285,971 B1 | * | 9/2001 | Shah et al. ..................... | 703/2 |
| 6,310,626 B1 | * | 10/2001 | Walker et al. .............. | 345/589 |
| 6,331,835 B1 | * | 12/2001 | Gustafson et al. ..... | 342/357.06 |
| 6,415,276 B1 | * | 7/2002 | Heger et al. ................... | 706/52 |
| 6,625,569 B2 | * | 9/2003 | James et al. ................ | 702/183 |
| 6,708,137 B2 | * | 3/2004 | Carley ......................... | 702/179 |
| 2002/0040278 A1 | * | 4/2002 | Anuzis et al. ................. | 702/56 |
| 2002/0138210 A1 | * | 9/2002 | Wilkes et al. ................. | 702/28 |
| 2002/0169582 A1 | * | 11/2002 | Eryurek et al. ............. | 702/183 |
| 2003/0124610 A1 | * | 7/2003 | Kvalheim et al. ............. | 435/8 |
| 2003/0171896 A1 | * | 9/2003 | Rao et al. ................... | 702/183 |
| 2004/0141641 A1 | * | 7/2004 | McDonald et al. ......... | 382/159 |

* cited by examiner

*Primary Examiner*—Carol S. W. Tsai
(74) *Attorney, Agent, or Firm*—Edell, Shapiro & Finnan, LLC

(57) ABSTRACT

A method and apparatus for performing continuous variance analysis (CVA) to characterize a data set. Data set values may be associated with any source, including measurements of a received signal and/or measurements of natural and/or man-made phenomena. CVA generates an output matrix that contains a measure of variation for a plurality of ranges (or windows) of data elements within a data set positioned at known locations within the data set. CVA output can be interpreted visually by a technician and/or using automatic numerical analysis. CVA is compatible with any apparatus/approach that uses numerical analysis to generate a predicted model based upon stored library models and/or linear/nonlinear components. CVA is compatible with any programming language and can be readily added to new and/or existing apparatus to compliment existing capabilities. CVA is less complex than conventional techniques, and requires less computer processing capacity, yet results in more readily interpretable results.

42 Claims, 19 Drawing Sheets

US 6,961,677 B1

METHOD AND APPARATUS FOR CATEGORIZING UNEXPLAINED RESIDUALS

FIELD OF THE INVENTION

The present invention pertains to signal processing. In particular, the present invention pertains to the categorization of unexplained residuals using numerical analysis techniques.

DESCRIPTION OF THE RELATED ART

Recorded measurements, or measurement values, whether associated with an observed natural or man-made phenomenon or associated with a signal originating from a natural or man-made transmission source, typically contain noise. For example, repeated measurements associated with a single unchanging event or known substance, even under controlled laboratory conditions, can result in a set of slightly varied data elements. Such noise is typically the result of errors introduced by measurement equipment, unknown sources of signal interference, background signals and/or a host of other unknown causes. Measurements, or measurement values, made in a less controlled environment under less controlled, or uncontrolled, operating conditions typically include greater amounts of noise. Such additional noise is typically the result of additional uncontrolled factors affecting the equipment used to make the measurements, additional sources of interference and/or additional unknown factors contributing to the measurement values.

Conventional methods for treating noise typically assume that the noise will have some constant character regardless of the values of the observations. Such noise occurs independently of the observations and is known as homoscedastic noise. The converse to homoscedastic noise is heteroscedastic noise. Heteroscedastic noise is related to the values of the observations/measurements (i.e. the measurement values). The most notable sources of heteroscedastic noise are unknown interferents that contribute to (or interfere with) the measured signal.

FIG. 1 presents a representative example of homoscedastic noise. As depicted in FIG. 1, the data points are randomly scattered about a line with zero slope. Given that FIG. 1 represents homoscedastic noise, a measure of variation (such as a standard deviation) calculated for the first 10 data points is equivalent to (or relatively close to) a measure of variation calculated for the second 10 data points and the measures of variation for both sets do not differ significantly from a measure of variation calculated for the entire segment.

FIG. 2 presents a representative example of heteroscedastic noise. As depicted in FIG. 2, the data elements follow a definite contour that cannot be characterized as random. This is because heteroscedastic noise is attributable to one or more real unknown sources contributing to (or interfering with) the values of the observations/measurements (i.e., measurement values). Further, given that FIG. 2 represents heteroscedastic noise, a measure of variation (such as a standard deviation) calculated for different contiguous portions of the segment can vary significantly.

In signal analysis based upon numerical analysis techniques, such as multiple linear regression (MLR) and classical least squares (CLS), a data set generated based upon a measured event or received signal is scaled and compared in a least squares manner against a predicted data set, or predicted model, generated from one or more stored library data sets and/or linear and nonlinear components until a best fit is achieved. If there is little residual noise compared to the level of the signal measured, then there is a high statistical confidence that the measured data set is accurately modeled by the predicted model.

Problems arise, however, in cases in which there is a high level of noise compared to the level of a measured (or received) signal, and hence, a low statistical confidence in the predicted model. A low statistical confidence level may arise from random noise, unknown contributors to the measured signal, or some combination of random noise and unknown contributors. Often, it is important to determine whether a system has measured a weak signal, thereby resulting in the high noise level compared to the magnitude of the measured signal, or whether the measured signal includes contributions from an unknown signal contributor not included in the predicted model, thereby resulting in the high noise level. For example, a measured data set can include contributions from a source that is not modeled by a data set in the system's stored data set library and therefore not included in the predicted model.

By comparing a predicted model, constructed from data sets retrieved from a data set library, with a measured data set, a residual data set may be computed that contains values that represent the difference between the values of the predicted model and the values of the measured data set. In the case of a measured data set that is based upon a strong signal that correlates closely with the predicted model, the values of elements within a residual data set will be small. In the case of a measured data set that is based upon a weak signal or for which the predicted model is inadequate, the residual data set values may be of the same magnitude as the measure data elements. In the respective cases, however, the nature of the residual will be quite different. In the case of a measured data set based upon a weak signal, the residual will be homoscedastic in nature. In the case of a measured data set containing contributions (or interference) from sources not included in the predicted model, the residual will be heteroscedastic in nature.

Therefore, characterizing residual noise as either homoscedastic or heteroscedastic is one way of allowing a data set containing a high noise content to be properly interpreted and the information derived therefrom put to appropriate use. In this manner, information contained in data sets containing homoscedastic noise due to measurement of a weak signal can be relied upon whereas, otherwise, the data set would have been ignored or discarded as unreliable. In addition, information contained in data sets containing heteroscedastic noise due to interfering sources can be further analyzed to determine the nature of the unknown substance and/or discarded, depending upon the nature of the application.

Unfortunately, conventional techniques for analyzing unexplained residuals are not adequate for determining whether an unexplained residual is homoscedastic or heteroscedastic in nature or for characterizing a residual in other meaningful ways. For example, a technique known as Continuous Wavelet Transform (CWT) computes wavelet transformation over multiple scales for a particular signal. The CWT approach is computationally intense to compute, and application of the approach typically requires more specialized knowledge than an operator may possess. Additionally, the diagnostics that the CWT approach generates are not easily interpretable. Further, it is difficult to program a CWT application from scratch for use within the wide range of existing systems in which the approach could be applied. Moreover, the output of a CWT analysis is a matrix of fitting coefficients at different scales, which is not useful for numerical analysis or automatic decision making, since the coefficients are ambiguous with regard to their discrimination between heteroscedastic signals and homoscedastic signals and the coefficients are not associated with any qualitative characteristics.

Hence, a need remains for a method and apparatus for analyzing an unexplained residual data set to categorize the residual data set as a homoscedastic or heteroscedastic signal and/or to categorize the residual in other meaningful ways. Preferably, such an approach would not be computationally intense and the generated results would not require specialized knowledge to interpret. Further, such an approach would preferably be easily implemented within a wide variety of existing and future systems operating a variety of platforms and support automated analysis and decision making based upon the generated results.

SUMMARY OF THE INVENTION

Therefore, in light of the above, and for other reasons that will become apparent when the invention is fully described, an object of the present invention is to categorize unexplained signal residuals as either homoscedastic or heteroscedastic.

Another object of the present invention is to reduce the computational processing associated with the analysis of signal residuals.

Still another object of the present invention is to produce signal residual analysis results that are easy to interpret and that support automated decision making.

Yet another object of the present invention is to support implementation of signal residual analysis on a wide rage of platforms and system in support of a wide range of applications.

The aforesaid objects are achieved individually and in combination, and it is not intended that the present invention be construed as requiring two or more of the objects to be combined unless expressly required by the claims attached hereto.

In accordance with the present invention, a Continuous Variance Analysis (CVA) enabled apparatus and method is described that compares a measured data set, containing a high noise to signal ratio, to a predicted model to produce a residual data set that is then characterized using the numerical and/or visual techniques described here. The measured data set typically contains measurements based upon an observed natural and/or man-made phenomenon and/or a received signal generated by a natural and/or man-made transmitter source. The predicted model, with which the measured data set is compared, typically includes one or more stored data sets that are associated with known components that are believed to have contributed to the measured signal from which the measured data set was generated.

In one embodiment, CVA generated output based upon the residual data set is analyzed, either visually or numerically, to determine whether the residual data set is homoscedastic or heteroscedastic. If the residual data set, or noise, is categorized as homoscedastic, the deviations in the predicted model from the measured data set are random in nature and confidence in the predicted model is improved. If the residual noise is categorized as heteroscedastic, the predicted model has failed to capture a significant non-random contributing/interfering source contributing to the measured data set. In other embodiments, the CVA generated output is assessed using other techniques, such as N-way Principal Component Analysis (n-PCA), to characterize the nature of the related residual data set in other meaningful ways.

The Continuous Variance Analysis (CVA) enabled apparatus and method, described here, calculates a measure of variation for a residual data set over several different scales (or windows) and generates an output array, or matrix, that contains a measure of variation for windows of data elements positioned at known locations within the residual data set. In one embodiment, a CVA output matrix (e.g., an array or matrix containing measures of variation) is generated that contains a measure of variation for a window of every possible window size, centered upon each data element contained within the residual data set. The generated CVA output matrix is assessed and used to characterize the residual data set as described above. A measure of variation, as described above, can be any generated numerical measure of the degree of difference between one or more of the respective data set values within a window. Such a measure of variation can include, but is not limited to, variances, deviations (such as deviations from the mean or standard deviations), or any other numeric or statistical measure of the degree of difference in the data set window values, as described above.

The CVA output matrix (or vector) can be interpreted visually by a technician and/or using an automatic numerical analysis tool. Whether assessing the CVA output visually or numerically, the assessment process attempts to identify significant differences in the measures of variation determined for the respective windows. For example, the magnitude of changes in the calculated measures of variation that trigger classification of a residual as heteroscedastic can be defined with respect to a threshold window size and a maximum allowed difference. If during visual or numeric assessment of the CVA output a change greater than the maximum allowed difference is detected across a set of measures of variance calculated for windows of size greater than the threshold window size, the residual data set is classified as heteroscedastic. Otherwise, the data set is characterized as homoscedastic. For example, a technician can visually interpret CVA results via direct inspection the CVA numeric output, inspection of an image plot of CVA numeric output, or inspection of output from a numerical analyzer that has further numerically processed the CVA output. The CVA enabled apparatus and method described here is compatible with any apparatus/approach that uses numerical analysis techniques, such as multiple linear regression (MLR), classical least squares (CLS), and other linear and nonlinear techniques to generate a predicted model based upon stored library components and/or mathematical models. CVA is compatible with any programming language and can be readily added to a new and/or existing apparatus to compliment existing statistical analysis of residual data sets and/or independent data sets. CVA is less complex that conventional techniques, and requires less computer processing capacity, yet results in more readily interpretable results.

The CVA process can be applied to any set of values to assess the degree of variation within the set of values. A set of values can include a set of measured values (e.g., a measured data set), a set of residual values (e.g., a residual data set), or any set of values base upon one or more signals or events. Regardless of the nature or origin of the set of values assessed, the CVA process output provides a basis by which to visually or numerically assess and to categorize the degree of differences in the measures of variation selected for the data set.

The above and still further objects, features and advantages of the present invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
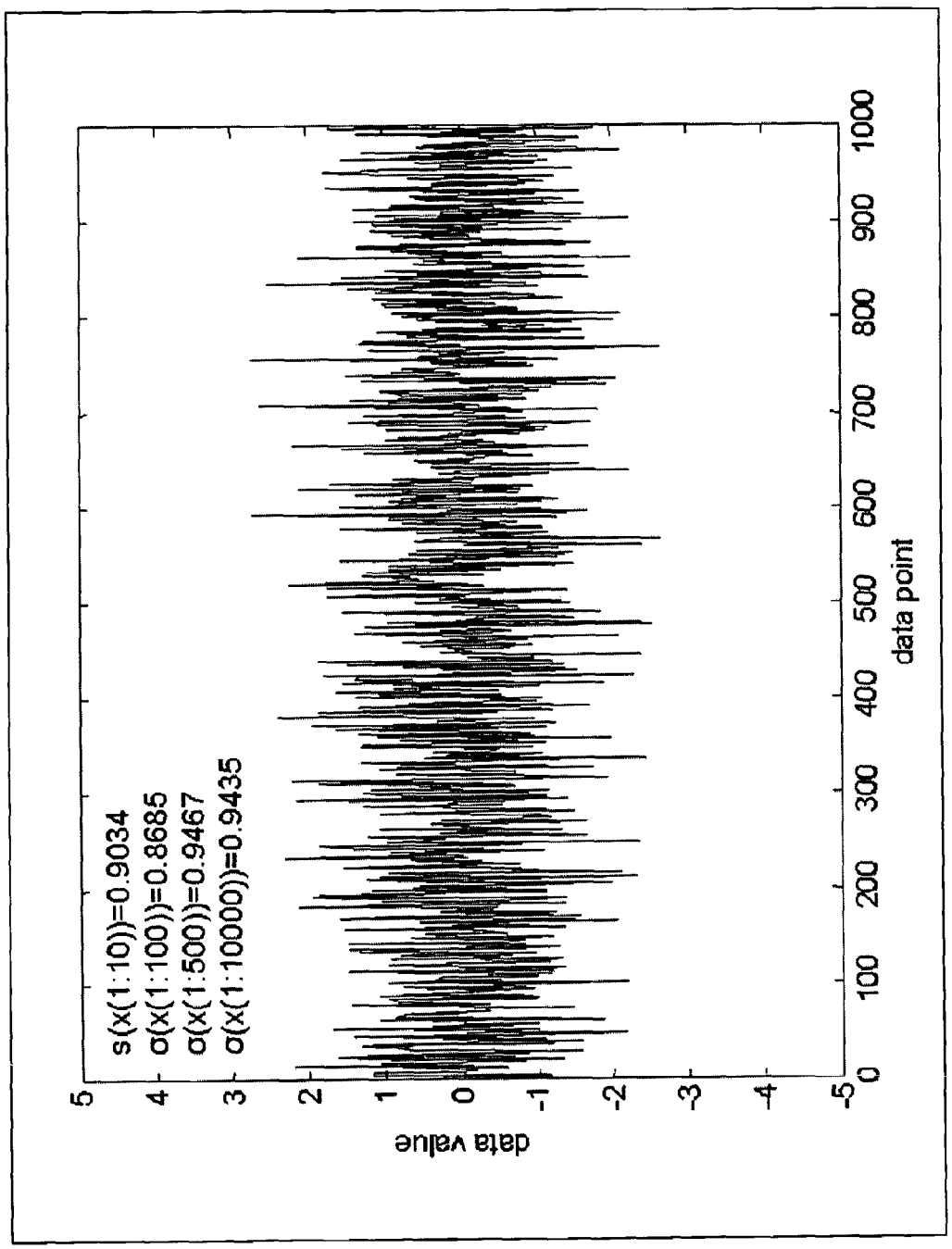
FIG. 1 is a plot illustrating a segment of homoscedastic noise.

Preferred embodiments according to the present invention are described below with reference to the above drawings, in which like reference numerals designate like components.

The present invention relates to a novel method and apparatus for assessing residual noise, associated with virtually any measured observation or communication signal, to determine whether the noise is homoscedastic or heteroscedastic in nature. If a residual noise signal is homoscedastic, a measure of variation calculated for a subset, or window, taken from anywhere within the residual signal, is similar to the measure of variation of the entire residual. If a residual noise signal is heteroscedastic, the measure of variation calculated for subsets, or windows, vary significantly depending upon the size of the window and the position of the window within the residual signal.

The method and apparatus described implements a novel process, referred to as Continous Variance Analysis (CVA), which assesses the heterogeneity or homogeneity of a residual signal across a wide range of window sizes and across a wide range of window positions. CVA is achieved by calculating a measure of variation for windows of various, or continuous, sizes and stepping the window across the entire residual data set in incremental, or continuous, steps. Such a measure of variation can include, but is not limited to, variances, deviations (such as deviations from the mean or standard deviations), or any other numeric or statistical measure of the degree of difference in the data set window values, as described above. The approach is to calculate measures of variation for the data on several different scales, and to observe the heterogeneity or homogeneity of the calculated measures of variation across the different scales. Different patterns arise from homoscedastic and heteroscedastic noise which are visible to the eye and/or are easily identified using a rule based decision making algorithm. The advantages of this method include ease of implementation across varied software platforms, increased interpretability, and support for automated analysis of generated results.

Figure 3:
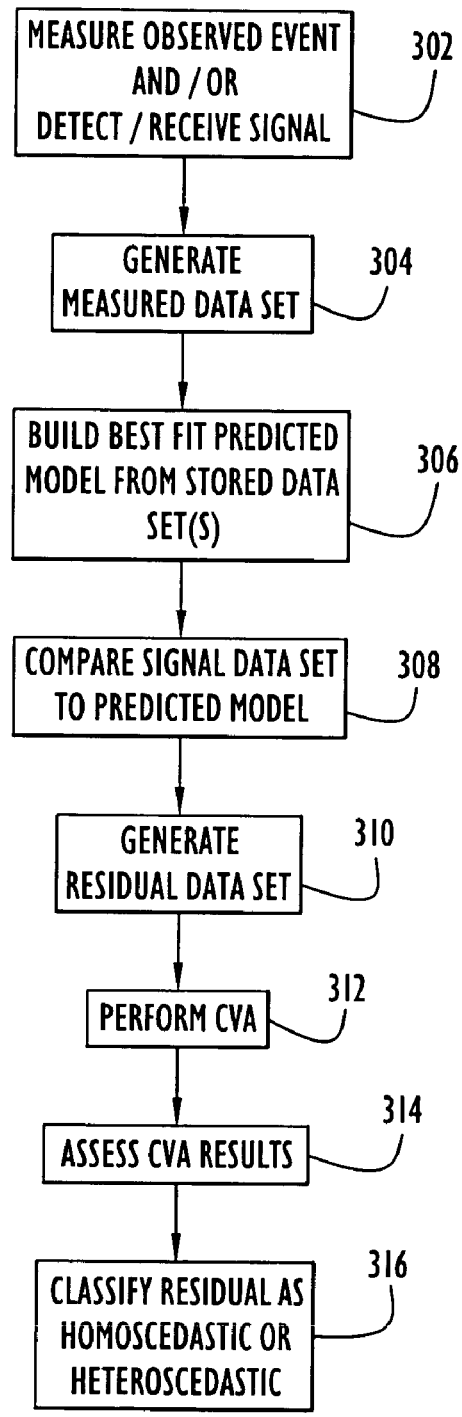
FIG. 3 is a process flow diagram depicting representative activities performed by an apparatus that includes CVA processing in accordance with an exemplary embodiment of the present invention.

FIG. 3 is a procedural flow chart that identifies the steps associated with applying CVA to virtually any process that generates a residual noise data set related to a measured data set based upon measurements of an observed event (such as an observed Raman Effect or other observable/measurable event) and/or measurements of a detected/received radio frequency (RF) signal. As shown in FIG. 3, at step 302, values associated with an observed event or a detected/received signal are used to generate, at step 304, a measured data set. Typically, the measured data set values are stored in a vector in which each vector data element contains a measured value. Depending upon the physical event observed or type of signal received, a data element of the measured data set can store information related to any measured characteristic associated with the physical event observed and/or the type of signal received.

Once the measured data set is generated, a predicted model is built, at step 306, based upon stored data sets retrieved from a data set storage module and/or linear and/or nonlinear components. Typically, least squares analysis is used to generate a curve (i.e., a predicted model) that is a best fit to the measured data set. For example, if the measured data set is associated with a spectral analysis of a chemical mixture, the predicted model is typically based upon a combination of data sets associated with individual chemical components that may be present in the measured sample. By way of a second example, if the measured data set is associated with a communication signal, the predicted model is typically based upon a combination of data sets associated with background noise and/or interfering or contributing signals likely to be present within the operating environment. In such a multiple linear regression analysis (MLR) approach, data sets are added to and/or removed from the predicted model until a best fit is achieved, based upon the data sets stored in the data set storage module.

It should be noted that in order to arrive at an accurate predicted model that makes physical sense, the data set storage module must include a sufficient number of data sets that are appropriate for building a predicted model of the measured data set. For example, if the measured data set is spectrum data measured during a Raman Scattering (or Raman Effect) analysis of an unknown substance, the storage module should include stored data sets associated with Raman Effect measurements of known substances likely to be contained within the measured compound. If, on the other hand, a predicted model were to be built using data sets associated with player statistics from the 1967 World Series, even if a very close fit were achieved, the predicted model would make no physical sense.

Once a best-fit predicted model is built, as described above, the predicted model is compared, at step 308, to the measured data set and a residual data set (i.e., data vector) is generated, at step 310, that is the difference between the predicted model and the original measured data set. Regardless of the magnitude of the values contained within the residual data set, if the predicted model is accurate, measures of variation calculated for the residual data set will reflect values representative of homoscedastic noise, as described above. However, if the predicted model is not accurate, measures of variation calculated for the residual data set will reflect values representative of heteroscedastic noise, as described above.

Therefore, in order to determine whether the residual data set contains homoscedastic noise or heteroscedastic noise, CVA is performed, at step 312, to calculate measures of variation for the residual data set for a stepwise, or continuous, range of window sizes that are each shifted in a stepwise, or continuous manner across all values of the residual data set. Representative steps associated with the CVA process are described with respect to FIG. 4, below. The CVA process performed, in step 312, results the generation of two matrices S and T. Each row of S represents a different integer window size, and each column represents a data element within the residual data set. The values in S are the standard deviations (i.e., a measure of variation, as described above) calculated for the respective window size centered upon the respective data element. Each row of T represents a different integer window size, and each column represents a data element within the residual data set. The values in T are the window sizes used to generate the corresponding value stored in S.

Figure 2:
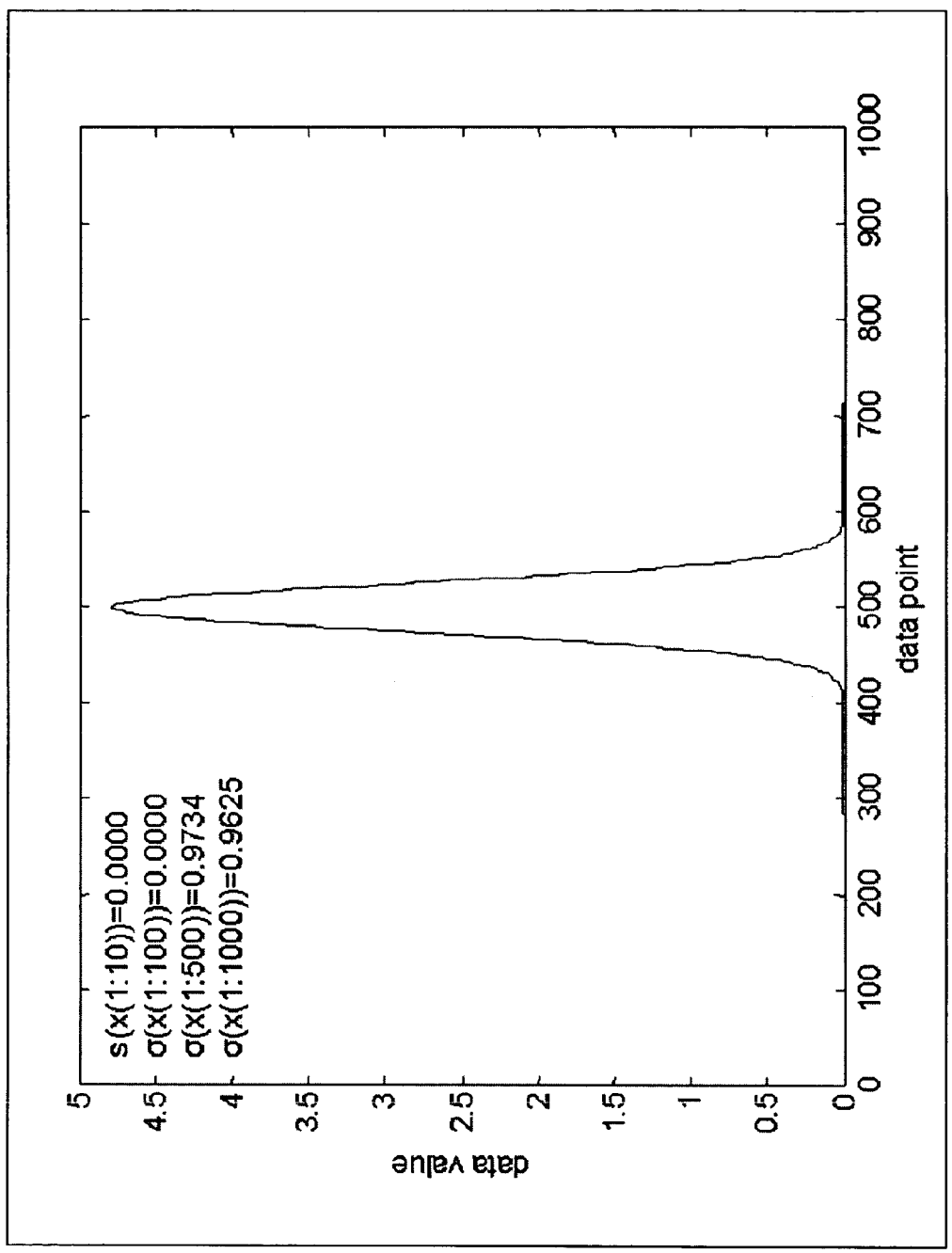
FIG. 2 is a plot illustrating a segment of heteroscedastic noise.

Next, at step 314, the values contained in array or matrix S (i.e., an array or matrix containing measures of variation) are assessed to determine whether the residual data set is homoscedastic or heteroscedastic. If the residual data set is homoscedastic (as shown in FIG. 1), there will be only slight differences between the measure of variation values calculated for small window sizes and the measure of variation values calculated for medium or large window sizes. If the residual data set is heteroscedastic (as shown in FIG. 2), there will be significant differences between the measure of variation values calculated for small window sizes and the measure of variation values calculated for the medium or large window sizes. Based upon the assessment of the CVA output, the residual data set is classified, in step 316, as either homoscedastic or heteroscedastic.

Once a residual data set is classified as homoscedastic, it is known that the residual data set contains random scatter. Therefore, the predicted model is likely an appropriate model of the communication signal or measured phenomenon represented by the original measured data set. If a residual data set is classified as heteroscedastic, it is known that the residual data set contains non-random noise and that the predicted model is likely a deficient model of the communication signal or measured phenomenon represented by the original measured data set. For example, if the original data set represents a received signal, the received signal likely includes a contributing component, such as a non-random interfering signal, that is not modeled by a data set in the data set storage module and therefore not included in the predicted model.

Figure 4:
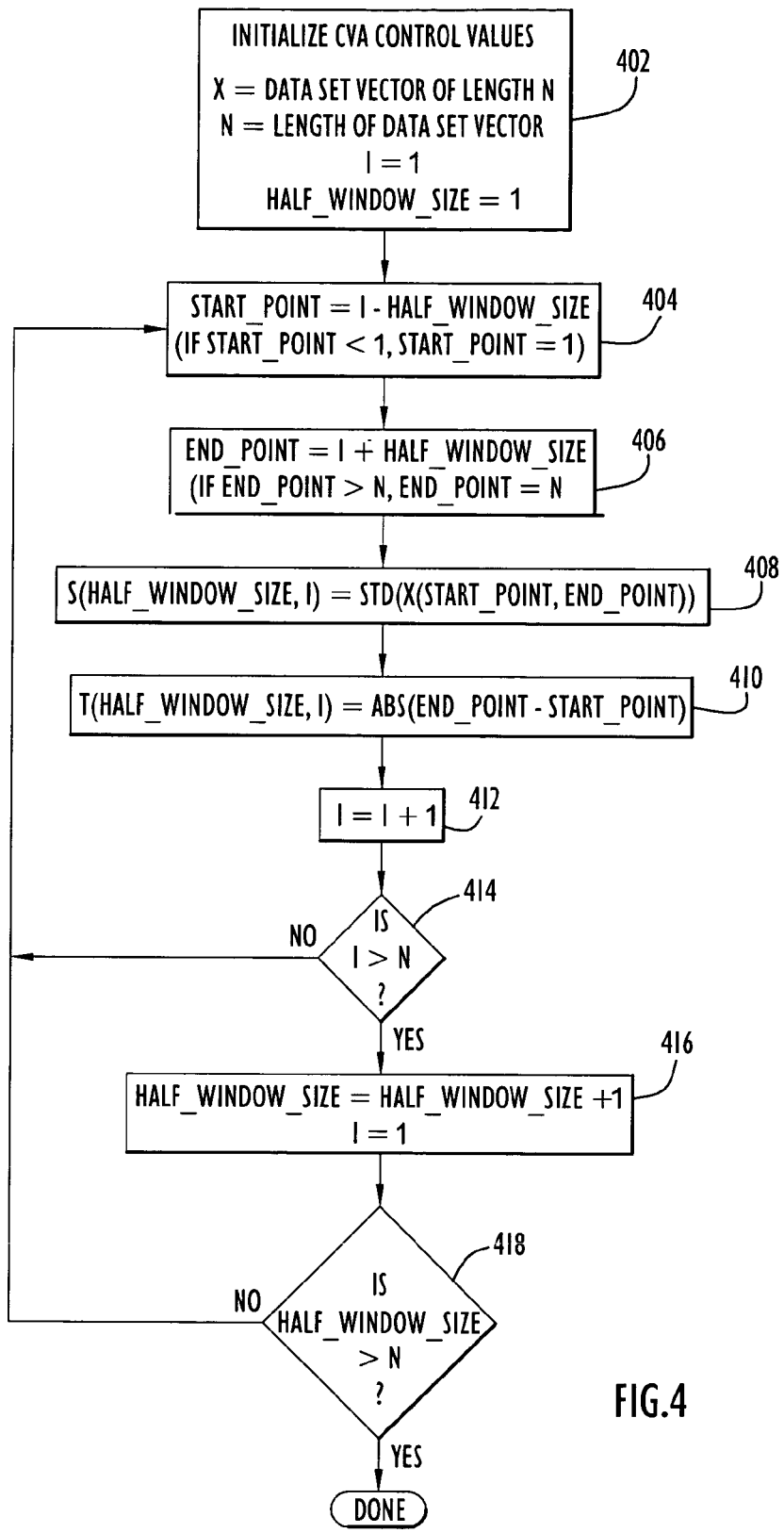
FIG. 4 is a process flow diagram depicting representative activities performed to generate CVA output data in accordance with an exemplary embodiment of the present invention.

FIG. 4 presents a representative, non-limiting process workflow associated with performing CVA, as shown in FIG. 3, at step 312. The process calculates a value of matrix S and a value of matrix T for each possible even sized window as the center point of each respective window is shifted across each possible data element contained within the residual data set. The values generated are stored in matrices S and T and used to generate visual plots or to support automated numerical analysis used to classify the residual signal as homoscedastic or heteroscedastic, as described above. A technician can visually interpret CVA results via direct inspection the CVA numeric output, inspection of an image plot of CVA numeric output, or inspection of output from a numerical analyzer that has further numerically processed the CVA output. First, as shown in FIG. 4 at step 402, data variables and control variables to be manipulated by the CVA process are initialized. Typically, the residual data set values are loaded into a data set vector, X, of length N (i.e., containing N data elements), and a control variable (half_window_size) and a data element counter (I) are both set to 1.

Next, a first logical loop (steps 404–418) is initiated that, upon completion of each loop iteration, increments the value of half_window_size by one (i.e., increases the window size for the next iteration by two). Within the first logical loop, a second logical loop (steps 404–416) is initiated that, in each iteration, shifts the center point of the current window size across each of the data elements contained within the residual data set. Upon completion of both nested logical loops, the CVA process is complete.

Specifically, at step 404, a start point (e.g., start_point) for a window to be calculated is set to a value equal to the present value of I minus the present value of half_window_size. If the value of start_point is less than 1, start_point is set to 1. In this manner the low-end bound of the window is established and the window is cropped to assure that the window only includes data elements that are within the residual data set vector. Next, at step 406, an end point (e.g., end_point) for the window to be calculated is set to a value equal to the present value of I plus the present value of half_window_size. If the value of end_point is greater than N, end_point is set to N. In this manner the high-end bound of the window is established and the window is cropped to assure that the window only includes data elements that are within the residual data set vector. As a result of steps 404 and 406, a start and end point are determined for a window that is typically equal in length to two times half_window_size, is centered upon the present value of I and is cropped, as necessary to remain within the bounds of the residual data set to be analyzed.

Next, at step 408, a standard deviation (or other measure of variation) is calculated based upon data elements within the residual data set that fall between the current start_point and end_point (i.e., for all values stored within data vector X a location start_point though location end_point) and stored in matrix S at location (half_window_size, I). Similarly, at step 410, a window size is calculated as the difference between the current start_point and the current end_point and stored in matrix T at (half_window_size, I).

At steps 412 and 414, the current value of I is incremented, at step 412, and if the value of is less than or equal to N, at step 414, processing continues at step 404 to calculate a value for S and T based upon the same window size centered upon the next data element I in residual data set X. If the value of I is greater than N, processing continues at step 416 where half_window_size is incremented by one and I is reinitialized to one. If at step 418, half_window_size is less than or equal to N, processing continues at step 404 to calculate a series of S matrix and T matrix values for the next incremental larger window size, as described above. Otherwise, if at step 418, half_window_size is greater than N, the CVA process is complete and the CVA output is ready for visual or automated data analysis.

Table 1, below, presents a representative segment of code, written for execution in a MATLAB computing environment, that is capable of implementing the CVA analysis process described above with respect to FIG. 4.

TABLE 1

MATLAB Code Sample

```
function[s, t]=cva(X)
%continuous variance analysis method
%inputs:
%X = a vector of length n
%s = an n by n matrix consisting of the standard deviations of the
window sizes described in t
%t = an n by n matrix containing the window sizes of each point in s
[n]=length(X);
for half_window_size = 1:n;
    for i = 1:n
        start_point = i-half_window_size;
        end_point = i+half_window_size;
        if start_point<1
            start_point=1;
        end
        if end_point>n
            end_point=n;
        end
        s(half_window_size, i) = std(X(start_point:end_point));
        t(half_window_size,i) = abs(end_point-start_point);
    end
end
```

Although the CVA embodiment presented in FIG. 4, above, describes the use of fixed increments for increases in window size and fixed increments for use in shifting the respective windows across the data set. Such increments can also vary in size during the CVA process depending upon the degree of resolution desired. CVA output can be generated (i.e., measures of variation can be determined) for a continuous range of windows sizes, from very small to very large. Window size increments are not limited to any minimum increment size nor are increments in window size limited to whole units of increment, regardless of increment size. In one embodiment, CVA includes a continuous range of window sizes, with each window shifted across the data set in near continuous increments.

Figure 5:
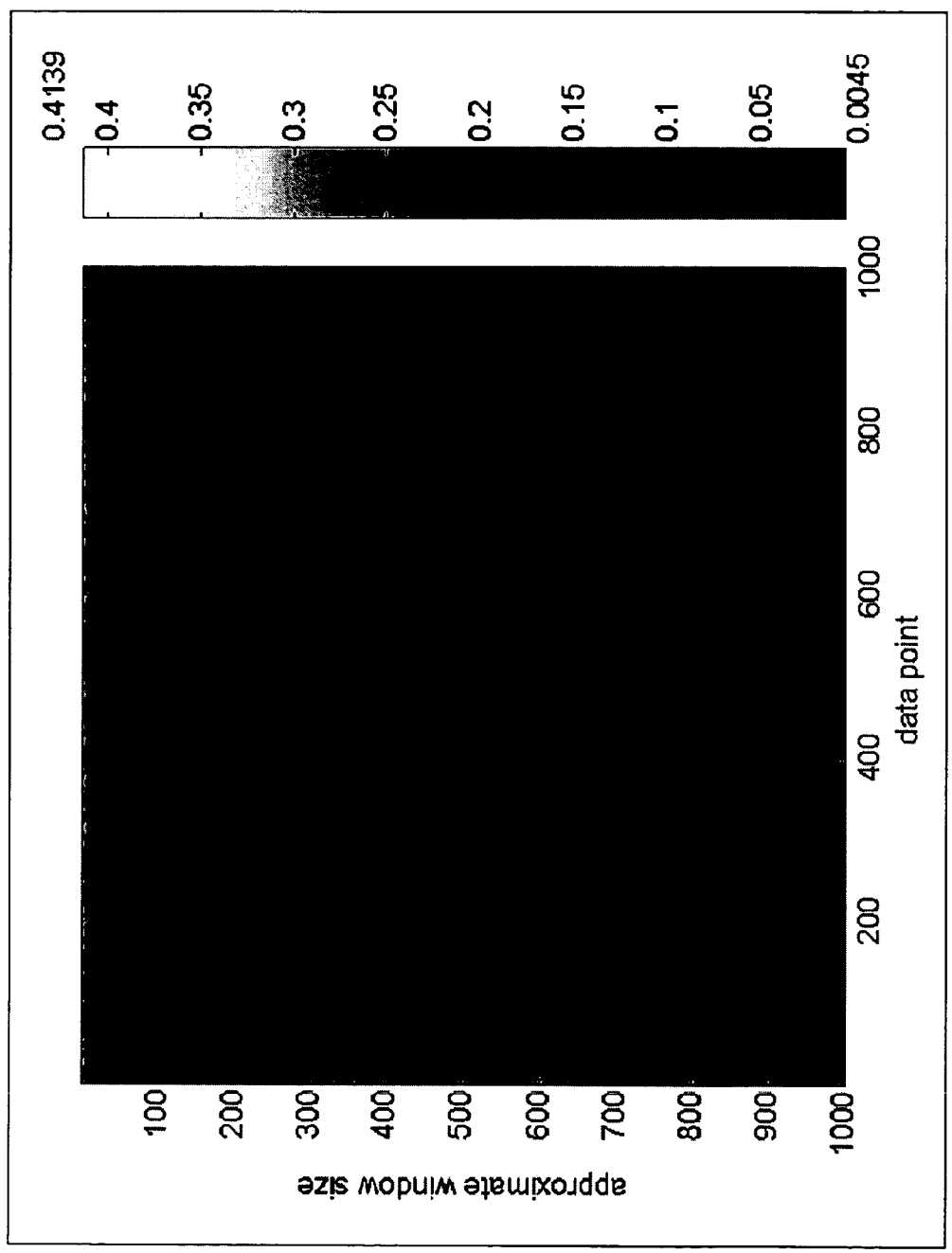
FIG. 5 is an image plot of the output resulting from CVA analysis of the homoscedastic signal segment of FIG. 1 in accordance with an exemplary embodiment of the present invention.

By way of a representative example of CVA analysis, FIG. 1, introduced above, presents one thousand data elements from a homoscedastic signal. FIG. 5 presents a two-dimensional image map of a CVA S matrix output (i.e., an array or matrix of measures of variation) generated for the homoscedastic signal of FIG. 1 in which darker shades are used to denote lower values and lighter shades are used to denote higher values. The vertical axis in FIG. 5 represents the respective window sizes for which measures of variation were calculated, the horizontal axis in FIG. 5 represents the data element about which each respective window size was centered. An individual shaded point within the plane of shaded tones represents a respective standard deviation value calculated for a specific window size/center data element combination. The CVA S matrix output presented in FIG. 5 can also be represented in a three-dimensional plot in which a third dimension, rather than darker or lighter tones, are used to depict S matrix values.

Visual assessment of either of FIG. 5 reveals that the calculated measures of variation are relatively consistent across both smaller and larger sized windows. Based upon the relatively even shade of the image presented, it is apparent that for widow sizes larger than approximately ten units, the variance remains consistent. As shown in FIG. 5, as the window size increases past very small values, the plot of the measures of variation quickly evens out and remains relatively constant across the remaining window sizes. Such behavior is characteristic of homoscedastic noise. By visually plotting CVA output, as shown in FIG. 5, such patterns can be easily identified via visual analysis by even an untrained technician. Further, such patterns can also be identified via numeric analysis based upon stored, user configurable thresholds.

Figure 6:
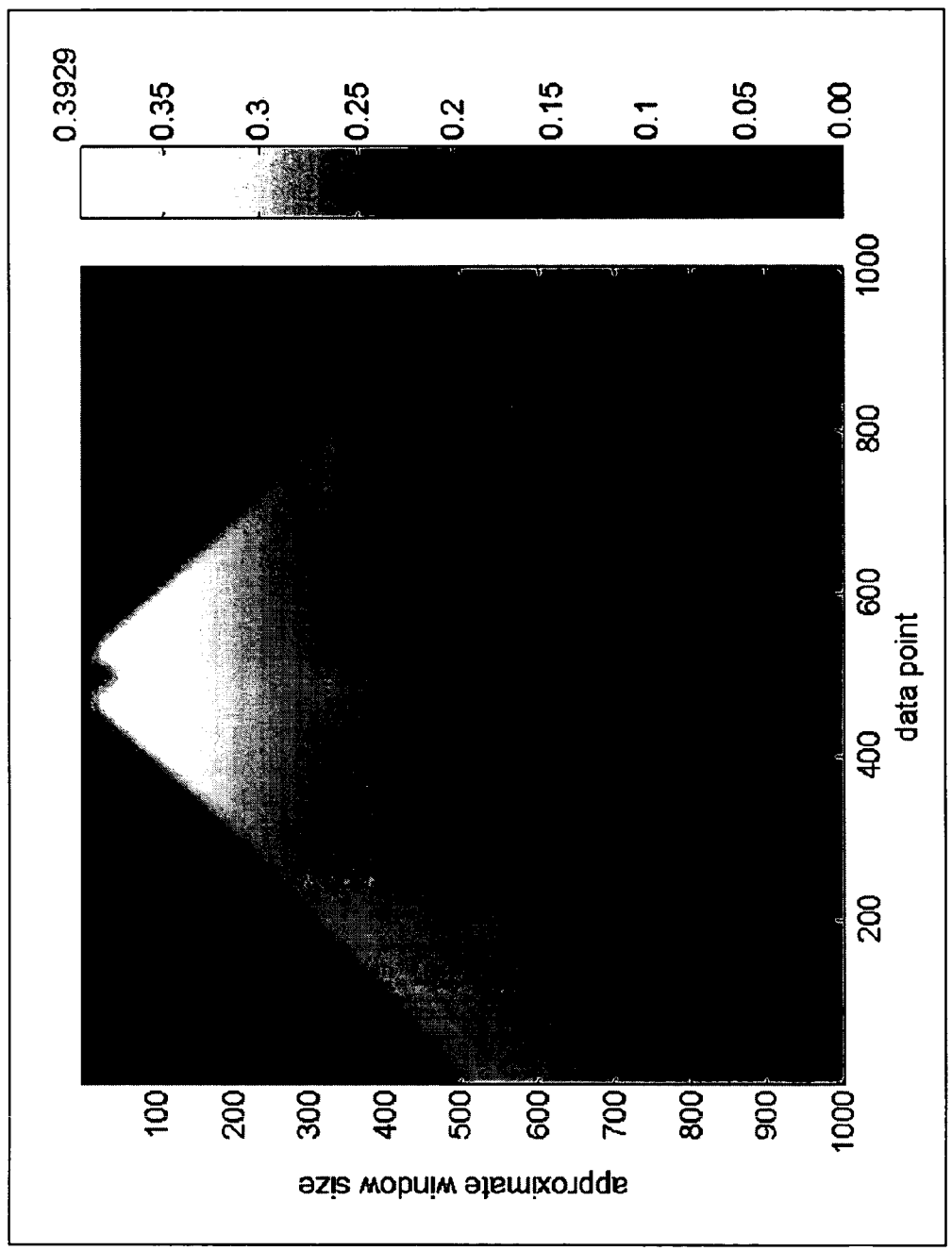
FIG. 6 is an image plot of the output resulting from CVA analysis of the heteroscedastic signal segment of FIG. 2 in accordance with an exemplary embodiment of the present invention.

By way of a second representative example of CVA analysis, FIG. 2, introduced above, presents one thousand measured data elements from a heteroscedastic signal. FIG. 6 presents an image map of a CVA S matrix output generated for the heteroscedastic signal of FIG. 2 in which darker shades are used to denote lower values and lighter shades are used to denote higher values. As previously described with respect to FIG. 5, the vertical axis in FIG. 6 represents the respective window sizes for which measures of variation were calculated, the horizontal axis in FIG. 6 represents the data element about which each respective window size was centered. An individual shaded point within the plane of shaded tones represents the respective standard deviation value (i.e., a measure of variation) calculated for a specific window size/center data element combination.

Visual assessment of FIG. 6 reveals that the calculated measures of variation show a large, dramatically clear change in the measure of variation values (i.e. a change in value more that ten-fold) that remains visible even at relatively large window sizes. For example, FIG. 6 shows a large rift in the calculated measures of variation from a value close to zero to a value close to 0.3. This large rift is present in windows sizes in excess of 200 units. By visually plotting CVA output, as shown in FIG. 6, such dramatic patterns can be easily identified via visual analysis by even an untrained technician. Further, such large rifts in the calculated measures of variation can also be identified via numeric analysis based upon stored, user configurable thresholds.

Figure 7A:
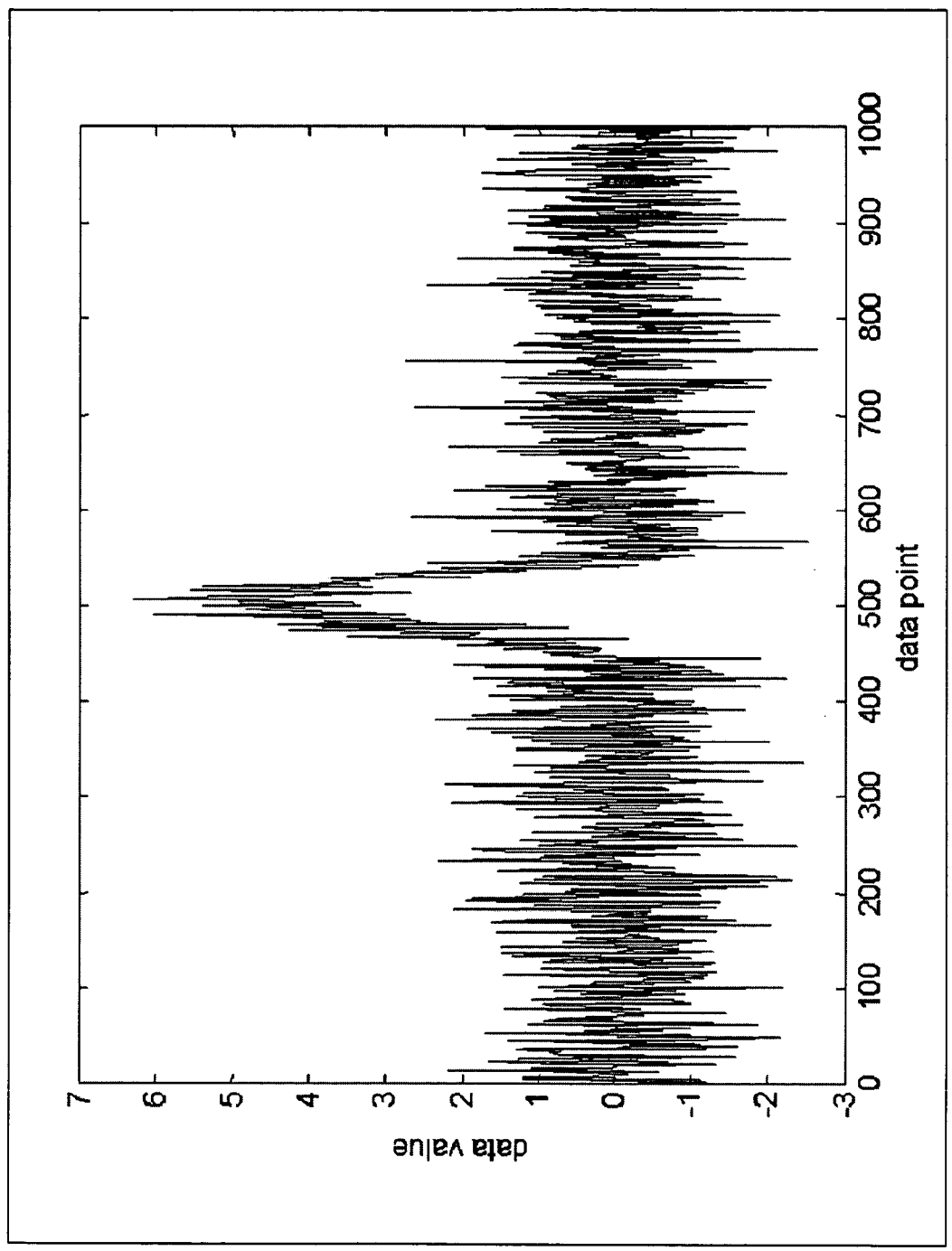
FIG. 7A is a segment of a combined homoscedastic and heteroscedastic noise.
Figure 7B:
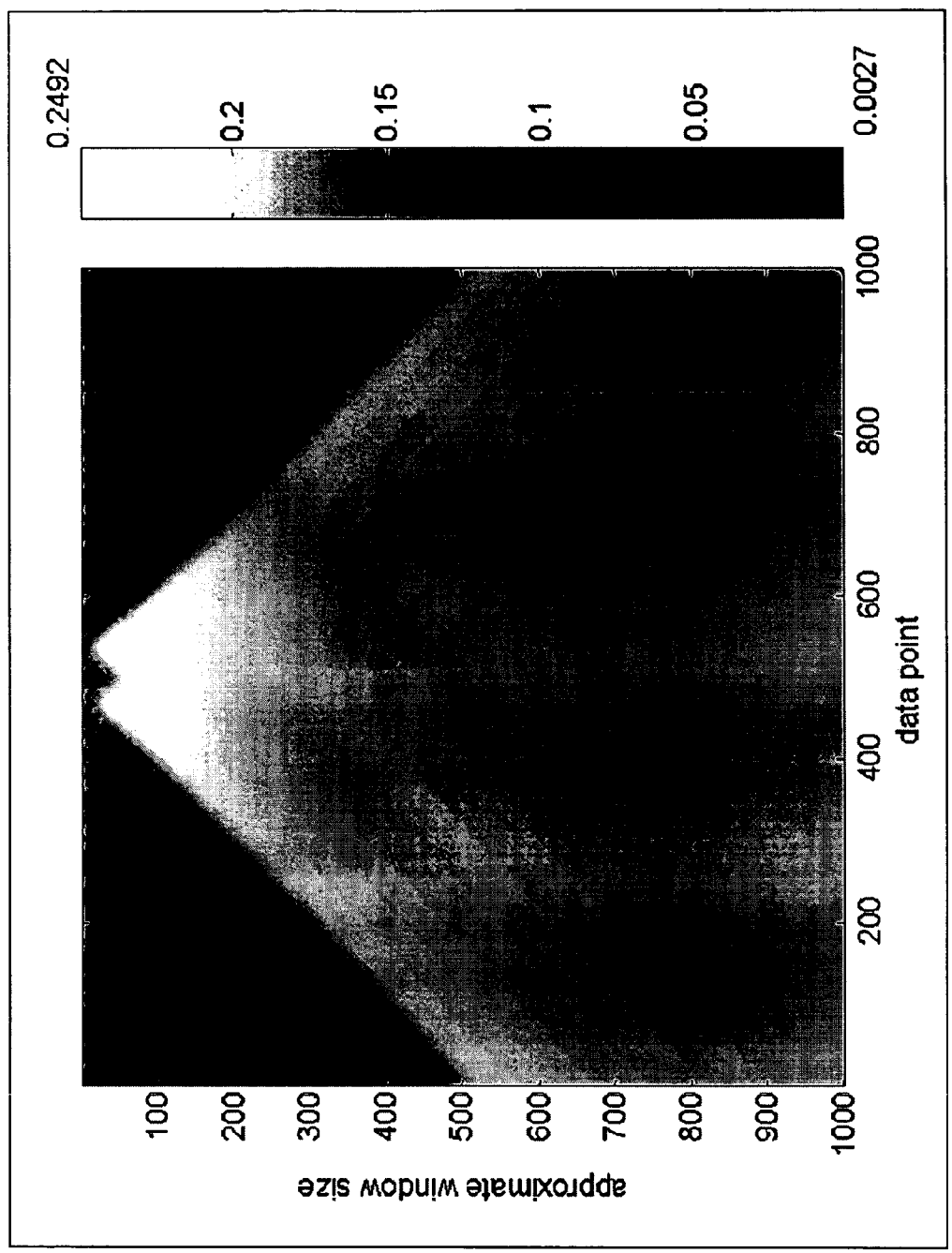
FIG. 7B is an image plot of the output resulting from CVA analysis of the segment of FIG. 7A in accordance with an exemplary embodiment of the present invention.

By way of a third representative example of CVA analysis output of a generic residual signal, FIG. 7A, presents one thousand data elements from a combined homoscedastic and heteroscedastic signal. FIG. 7B presents an image map of a CVA S matrix output generated for the combined signal of FIG. 7A in which darker shades are used to denote lower values and lighter shades are used to denote higher values. As previously described with respect to FIGS. 5 and 6, the vertical axis in FIG. 7B represents the respective window sizes for which measures of variation were calculated, the horizontal axis in FIG. 7B represents the data element about which each respective window size was centered, and individual points within the plane of shaded tones represent the respective standard deviation values (i.e., measures of variation) calculated for each respective window size/center data element combination.

Visual assessment of FIG. 7B reveals that the calculated measures of variation show a large, dramatically clear change in the variance values (as seen in FIG. 6) that remains visible even at relatively large window sizes. For example, FIG. 7B shows a large rift in the calculated measures of variation that is present in window sizes in excess of 200 units. By visually plotting CVA output, as shown in FIG. 7B, such dramatic patterns can be easily identified via visual analysis by even an untrained technician. Further, such patterns can also be identified via numeric analysis based upon stored, user configurable thresholds.

As demonstrated by the representative CVA outputs generated by applying CVA to representative homoscedastic and heteroscedastic data sets, it is apparent that CVA is a valuable tool for assessing residual data sets to determine whether the residual data set is homoscedastic or heteroscedastic. CVA processing is not limited to any particular technical application, but is a valuable method that can be applied to any signal, to determine whether the signal is homoscedastic or heteroscedastic. Once the nature of the signal is categorized as either homoscedastic or heteroscedastic, based upon visual analysis of automatic digital processing of the CVA output, that newly determined knowledge can be interpreted in relation to the nature of the data being analyzed and the data set contents of the data set storage module, as described above.

Figure 8A:
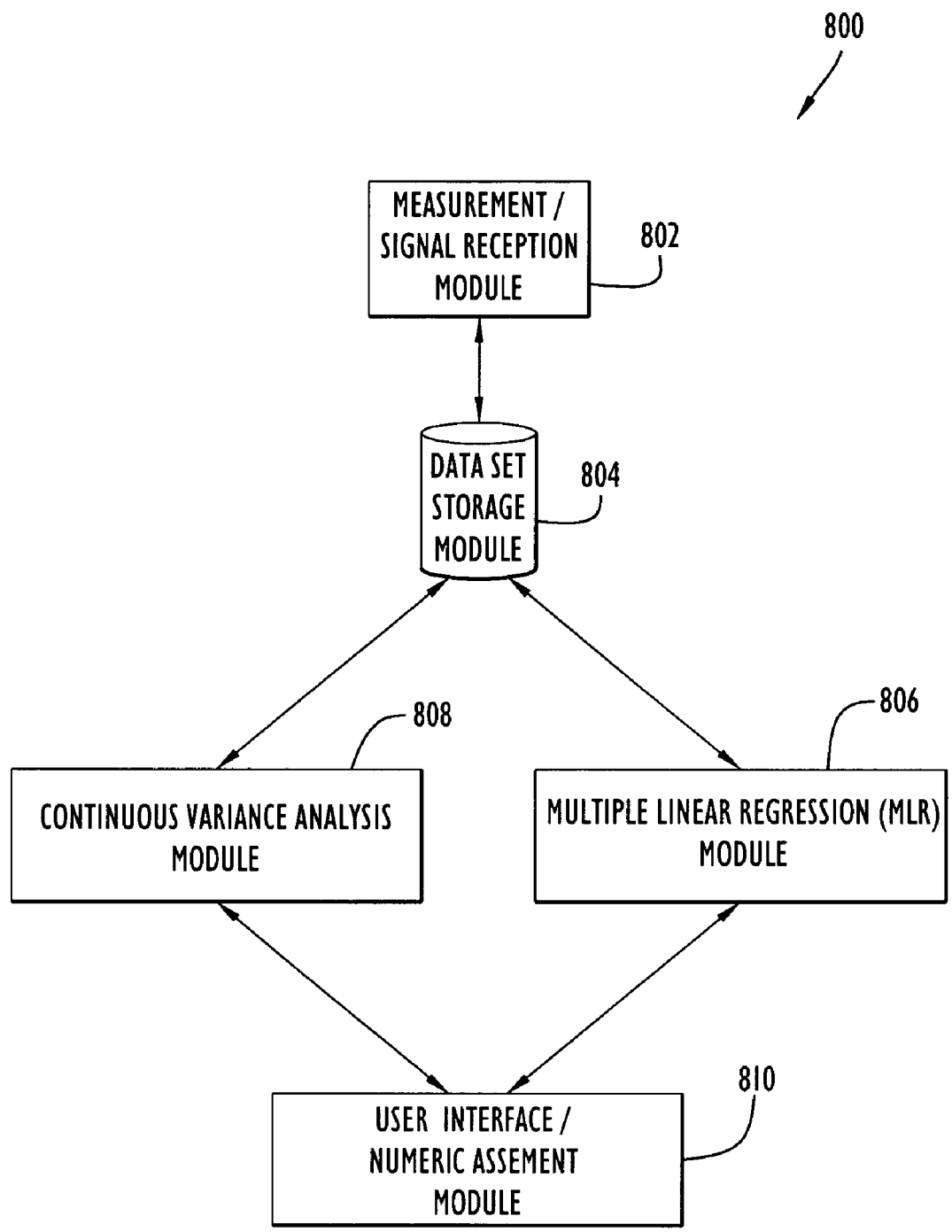
FIG. 8A is a block diagram of a representative apparatus that includes a CVA module in accordance with an exemplary embodiment of the present invention.

FIG. 8A is a system level block diagram of a generic analysis system 800 that includes a continuous variance analysis (CVA) module to supplement the analysis capabilities of the system. The system includes a measurement/signal reception module 802 the generates a measured data set and stores the measured data set in a data set storage module 804. As previously described, the data set generated by the measurement/signal reception module can be related to measurements associated with any observed natural and/or man-made phenomenon and/or the reception of any signal emitted from a natural and/or man-made transmission source.

Typically, generic analysis system 800 includes a multiple linear regression (MLR) analysis module 806 (i.e., a numerical analysis module) that uses a least squares approach to build a best fit predicted model based upon stored data sets retrieved from data set storage module 804. Depending upon the nature of the system and the degree of technician involvement in the analysis process, the MLR module will typically store the generated predicted model in data set storage module 804 and present the analysis results to a technician via a user interface module 810. Typically, the MLR module will generate a residual data set, containing values that represent the difference between data element values of the predicted model data set and the data element values of the measured data set. The residual data set can be used to generate statistics related to the degree of fit between the predicted model and the measured data set. Depending upon the nature of the system, the generated residual data set can be presented to the user visually, or indirectly in the form of generated statistics, such as a signal to noise ratio or a confidence value associated with the predicted model.

In cases in which the noise to signal ratio is high, resulting in a low confidence in the predicted model, such a generic analysis system 800, without the ability to perform additional analysis of the residual data set, may provide inconclusive results and/or insufficient information by which a technician can interpret the results in a meaningful manner. Inclusion of a continuous variance analysis (CVA) module 808 that is capable of performing CVA, as described above, greatly improves the ability of generic analysis system 800 to provide meaningful results with respect to high noise to signal measurements.

Upon automated request from MLR module 806 or a manual request from a technician via the user interface module 810, CVA module 808 retrieves from data set storage module 804 the residual data set generated by the MLR module as apart of the MLR analysis described above. Alternatively, if the MLR module did not calculate a residual data set, CVA module 808 retrieves the measured data set and the predicted models and generates its own residual data set for use in performing the CVA process. Upon generation of CVA output matrices S and T, as described above, CVA module 808 can present the CVA output to the user via user interface 810 in the form of a visual image or plot, as described above, or present the CVA output to an automated numerical analysis engine.

If the CVA output is presented to the technician, visually, the technician visually scans the generated image map and/or plot, as described above, looking for either dramatic differences in the measures of variation calculated that remain in measures of variation calculated for larger window sizes (i.e., characteristics associated with heteroscedastic noise), or for a rapid settling of any differences in the calculated measures of variation as the variance window size increases (i.e., characteristics associated with homoscedastic signals).

If the CVA output is presented as input to an automated numerical analysis engine, the engine may scan the S matrix output, numerically rather than visually, and determine whether the residual data set is homoscedastic or heteroscedastic based upon pre-stored and/or user configurable thresholds. In one representative, non-limiting embodiment, such threshold values define numerically, the same criteria that would be used by a technician to assess the output visually. For example, for a specific analysis system, threshold values may be set so that if a variance difference greater than ten-fold is detected within variance windows over 100 units wide, the numeric analysis system categorizes the residual as heteroscedastic, otherwise the numeric analysis system categorizes the residual as homoscedastic. In another analysis system, and/or the same analysis system as described in the previous example but operating in an environment with greater (or less) background noise, the window size and/or the size of change in the calculated measures of variation required to categorize a residual data set as heteroscedastic can be adjusted by the user manually or using an automated calibration technique that adjusts for background noise.

Figure 8B:
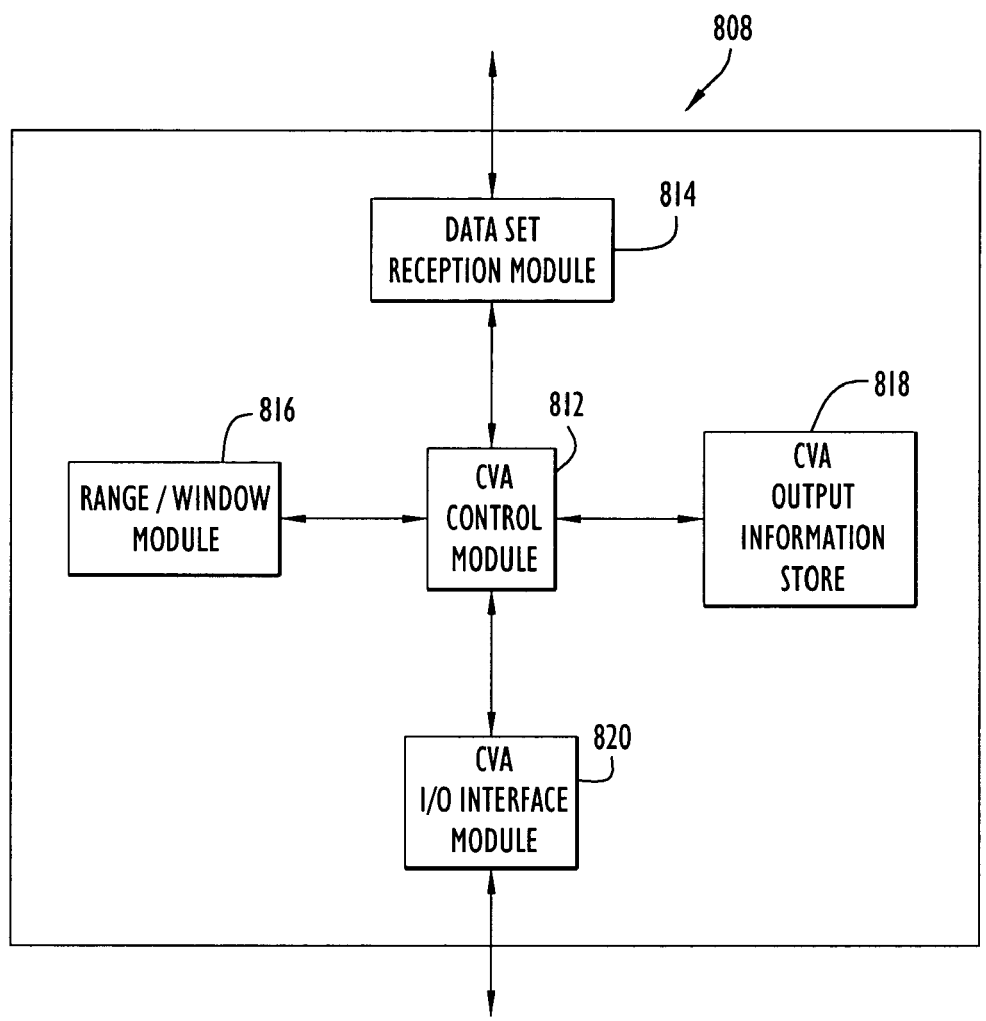
FIG. 8B is a block diagram of the representative CVA module of FIG. 8A in accordance with an exemplary embodiment of the present invention.

FIG. 8B is a block diagram of the representative, non-limiting CVA module presented in FIG. 8A at block 808. As shown in FIG. 8B, CVA module 808 includes a CVA control module 812 that controls and coordinates the generation of CVA output for a data set received (or retrieved) via a data set reception module 814. CVA control module 812 generates measures of variation for windows defined by a range/window module 816 and stores the generated measures of variation in a CVA output information store 818 in a manner that retains the window size and window position associated with each variance calculated. CVA control module 812 receives control parameters from a user interface/numeric assessment module (e.g., FIG. 8A, block 810) via a CVA I/O Interface module 820. For example, in one representative embodiment, CVA control module 812 instructs range/window module 816 to identify CVA data set windows for a data set received via data set reception module 814 based upon a window size increment parameter and a window shift increment parameter received from a user interface/numeric assessment module via CVA I/O interface module 820. For each CVA window identified by range/window module 816, CVA control module 812 generates a variance and stores the generated variance, and related window size/window position information, in a CVA output information store 818. Window size/window position information can be stored in any manner, either explicitly or implicitly. For example, in one representative embodiment window size and window position can be stored as data values associated with the generated variance value. In a second exemplary embodiment, generated measures of variation can be stored at a position in a matrix identified by a window size/position combination, thereby implicitly associating the generated variance with a unique window size/position combination. Upon generating a variance for each window associated with the CVA analysis, the CVA control module forwards the generated CVA output from CVA output information store 818 to a user interface/numeric assessment module (e.g., FIG. 8A, block 810) via the CVA I/O Interface Module 820.

One example of an analysis system that is similar to the generic analysis system described with respect to FIG. 8A, is the Laser Interrogation of Surface Agents (LISA) system. The LISA system uses a laser attached to a reconnaissance vehicle to look for chemical agents on the ground or on any surface. LISA uses a technique known a Raman Scattering (or Raman Effect), which is an optical property that can be exploited to identify known chemical agents.

The LISA system includes a spectral library of high resolution Raman spectra data sets of likely target agents and substrates in order to provide identification of substances encountered in operational environments. When a collected spectrum is input in the system, it is scaled, and compared to the library spectra in a least-squares manner. A measured data set (i.e., a vector) is returned that contains information on the relative amount of each chemical's contribution to the collected spectrum. If the spectrum collected is based only upon chemicals for which data sets are present in the spectral library, and there is little noise compared to the level of the signal, there will be high statistical confidence in that model and positive identification may be reported.

Problems arise however, when there is low statistical confidence in the model. This may arise from two causes, noise and unknown spectra, or some combination of the two. It is important to the user to know whether the LISA system is encountering a low signal situation in which only known compounds are present, but at very low levels, or if the system is encountering a new chemical signature not included in LISA's spectral library.

To demonstrate the effectiveness of CVA in support of LISA analysis, a set of controlled tests were conducted, the subject matter and results of which are described below. CVA can support LISA analysis by providing a easily implemented residual analysis capability that allows the LISA system to determine whether a measurement has encountered a low signal situation in which only known compounds are present, but at very low levels, or if the system is encountering a new chemical signature not included in LISA's spectral library.

In support of the controlled tests, a set of data sets were collected and stored in a data set storage module maintained by the LISA system by accumulating one-thousand spectra from pure samples of several known compounds and averaging the results to obtain a single data set for each known compound. Compounds for which data sets were generated and stored in the LISA data set storage module include: acetonitrile; air; cyclohexane; ethanol; ethylene glycol; isopropanol; methanol; teflon; quartz vial; and water. Only the fingerprint region (316–2543 cm-1) was used for the generation of stored data sets and the collection of test samples described in greater detail, below, since that region of the spectrum typically includes the most distinctive spectral peaks. The library spectra and the test spectra were scaled such that the minimum point of any spectrum was zero, and the maximum point was one. The library was then augmented with a vector of ones, a vector with positive slope, and a vector with negative slope. These vectors aid in the classical least squares (CLS) model's predictive ability when presented with noisy or sloping baselines.

In the test, the LISA system was used to generate measured Raman Effect spectrum data sets for several unidentified samples. A non-negative least squares algorithm was then applied to each measured data set and a generated regression vector, in each case, was assumed to contain rough estimates of the relative concentrations of the compounds represented by stored data sets in the LISA system data set library. Predicted models based upon the stored data sets, a residual data set and statistics related to the quality of the model overall were generated. For calibration models capturing less than 90% of the variance in the observed test spectrum, CVA was applied.

Figure 9A:
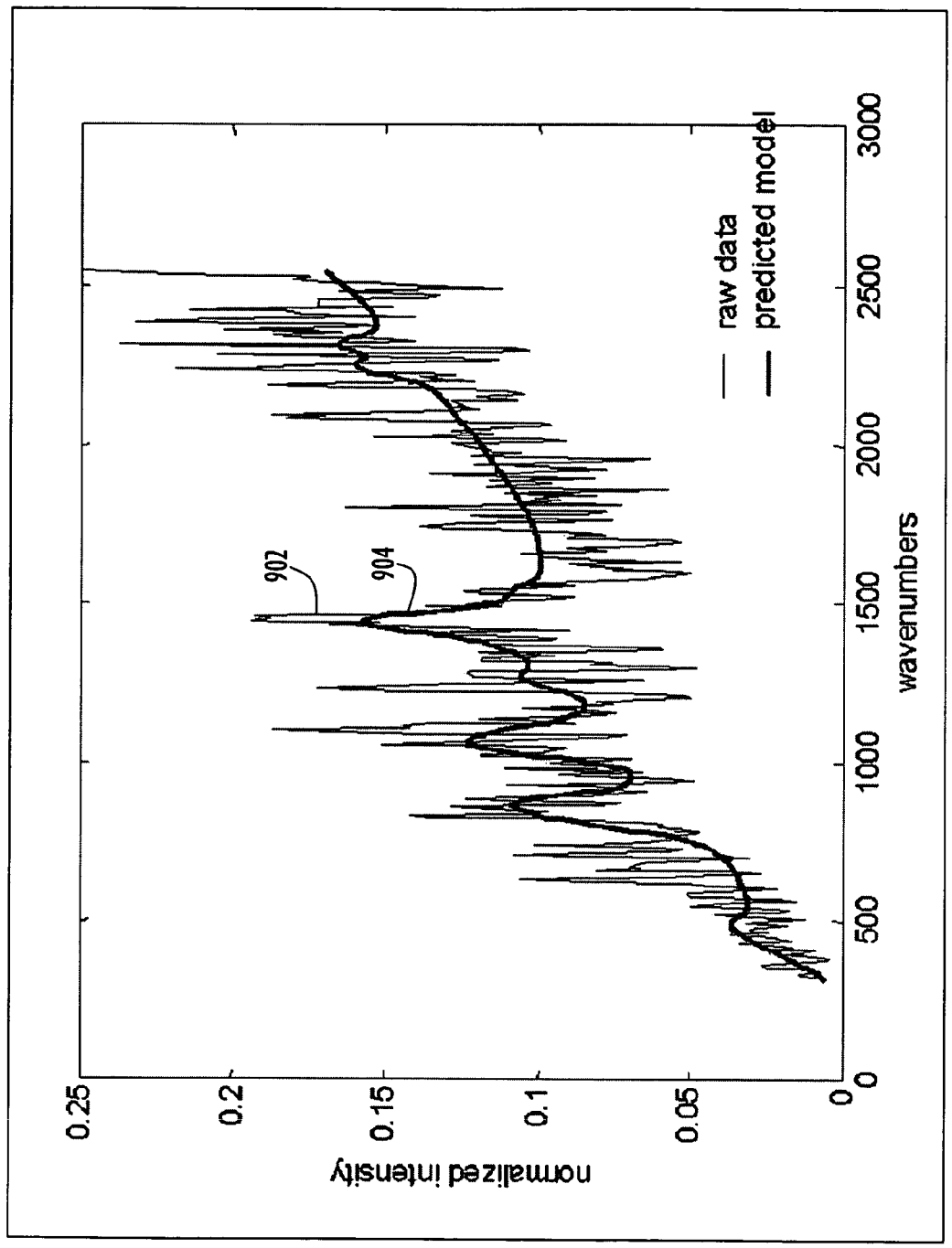
FIG. 9A is a plot of an observed spectrum of ethanol on a rock with an overlay plot of a predicted model based upon stored library spectra.
Figure 10A:
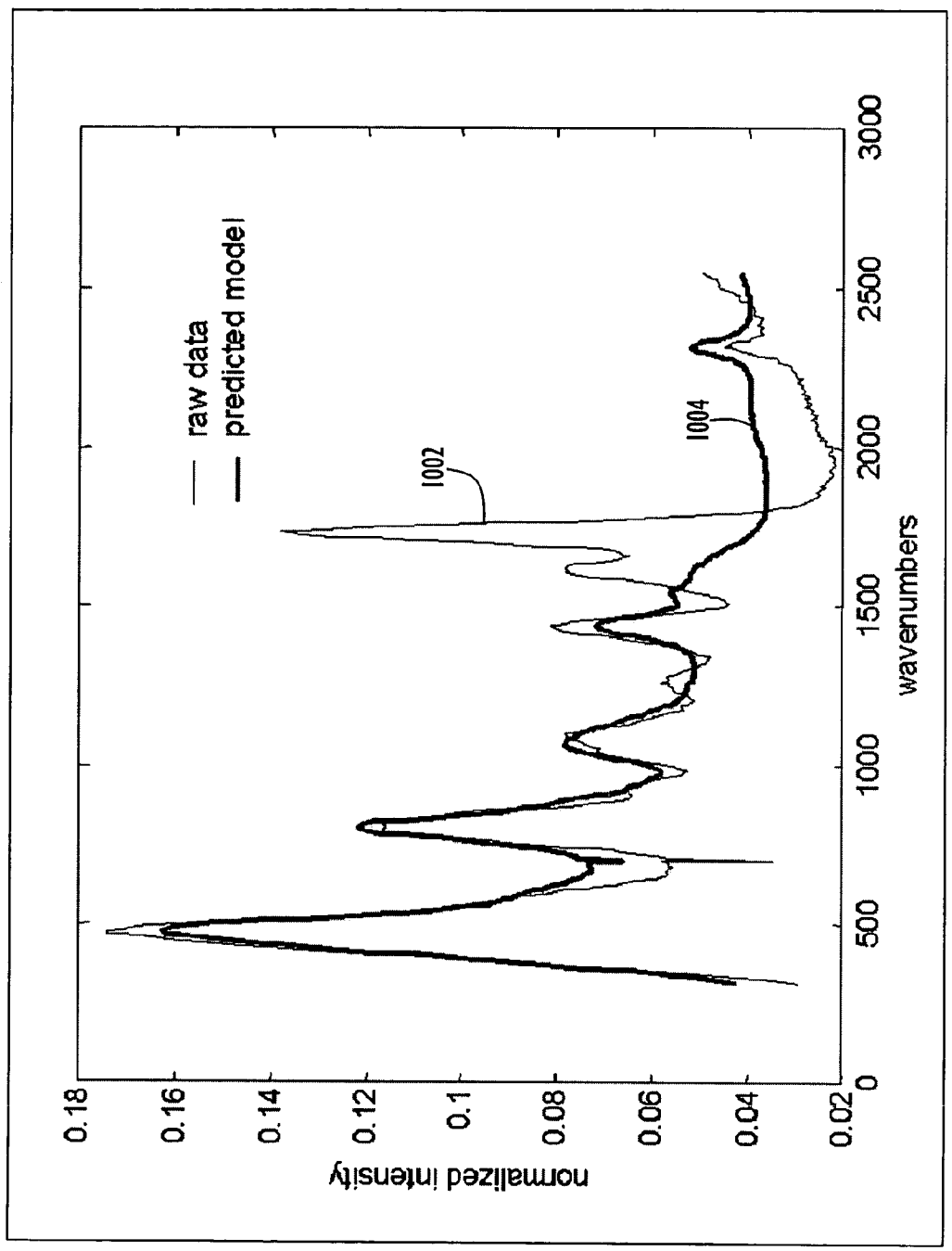
FIG. 10A is a plot of an observed spectrum of diethyl malonate (DEM) with an overlay plot of a predicted model based upon stored library spectra.
Figure 11A:
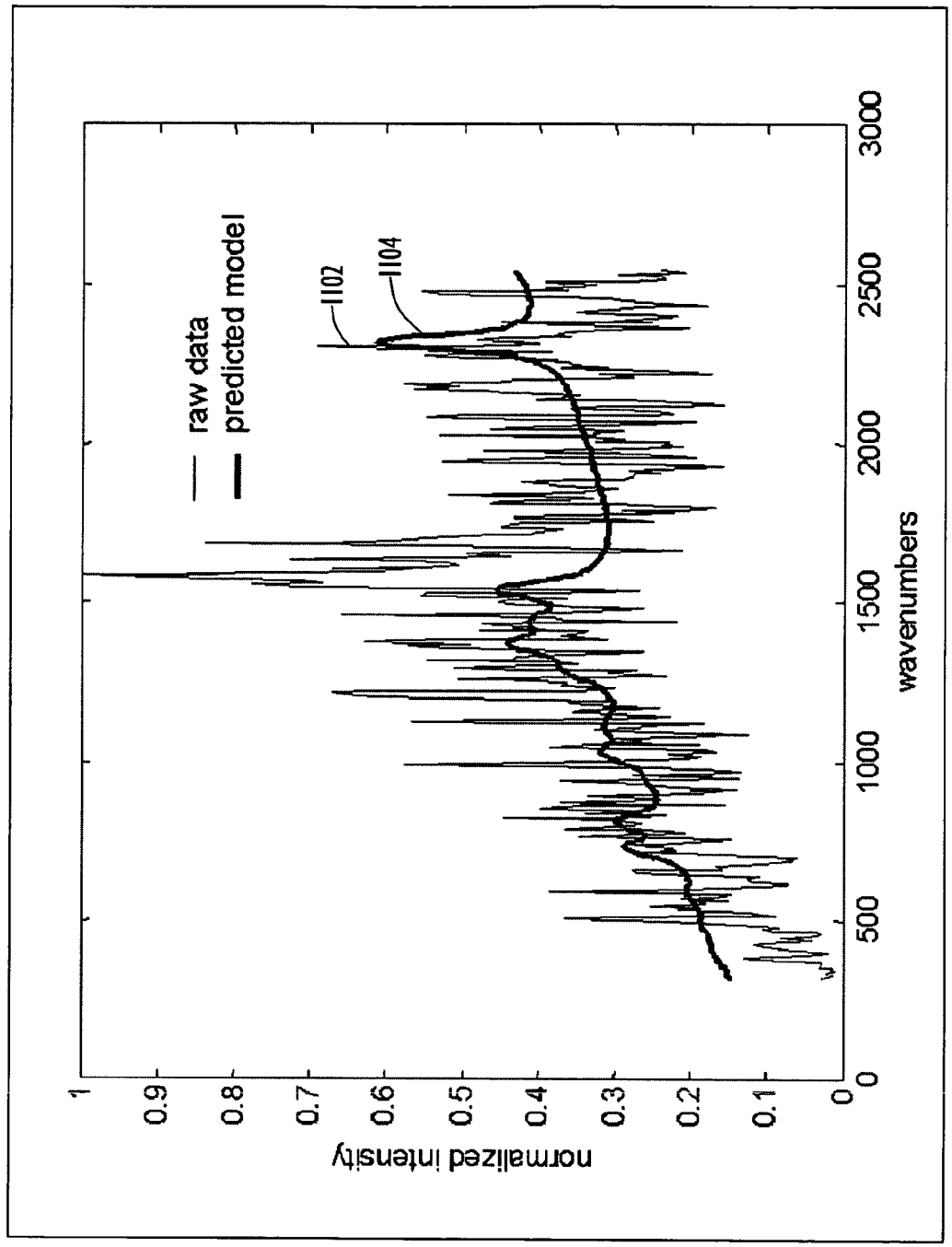
FIG. 11A is a plot of an observed spectrum of methyl ethyl salicylate (MES) with an overlay plot of a predicted model based upon stored library spectra.

FIGS. 9A, 10A and 11A present three measured data sets based upon spectrum data generated by the LISA system. A predicted model, generated for each of the respective measured data sets using a non-negative least squares algorithm based upon the stored library data sets, identified above, captures less than 90% of the variance in the respective measured spectrum data sets indicating that each measured data set includes a high level of noise. Conventionally, such a high noise to signal ratio results in a low confidence in the accuracy of the predicted model. Therefore, the objective of the controlled test is to determine using CVA whether the high levels of noise are the result of faint signals recorded by the LISA system, or whether the high levels of noise are due to contributions by one or more compounds for which data sets are not present in LISA's data set storage module and, therefore, were not included in the predicted model. This is accomplished, in each respective case, by analyzing the residual data set and determining, using CVA, whether the residual represents homoscedastic or heteroscedastic noise, as described above.

Figure 9B:
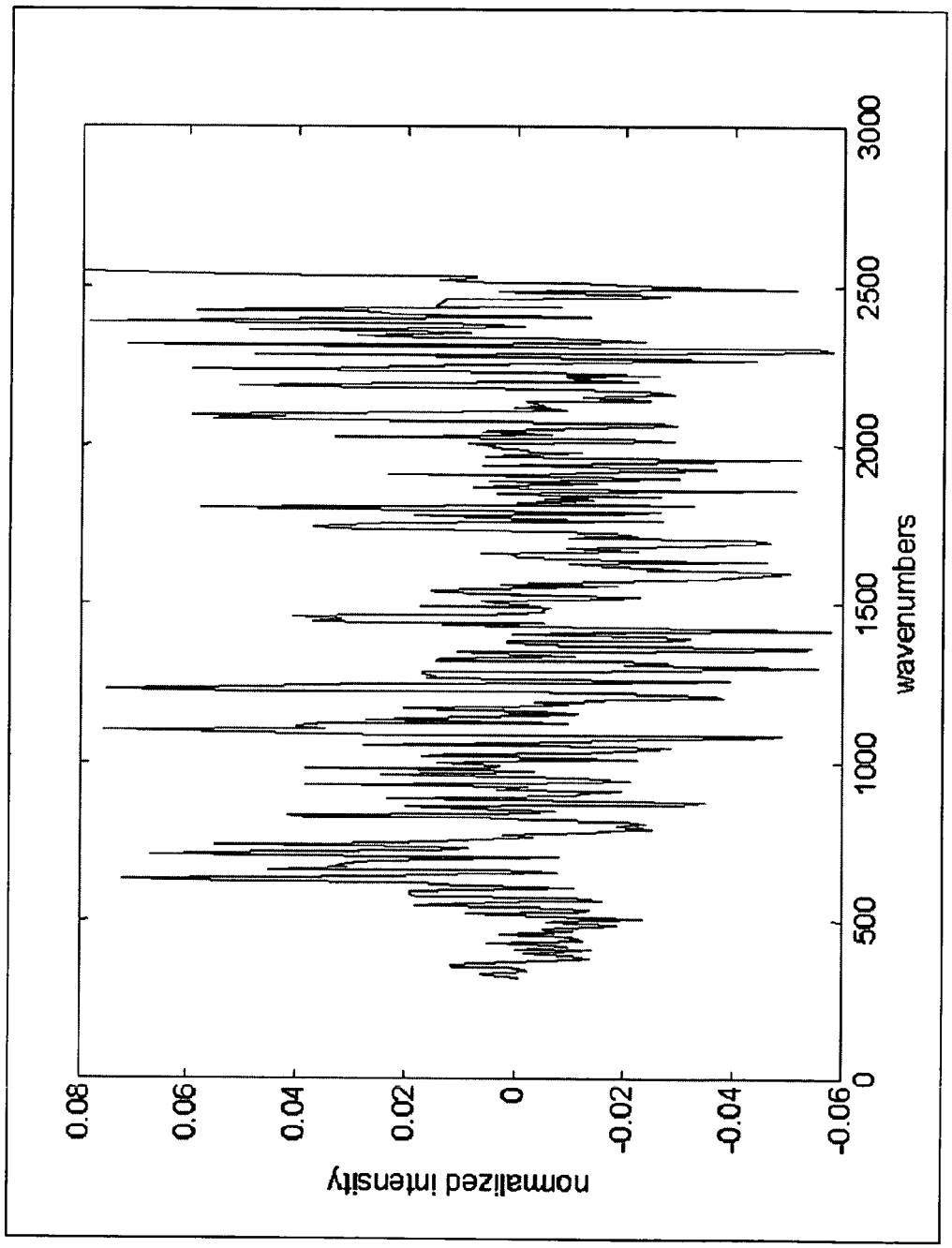
FIG. 9B is a plot of the residual between the observed spectrum and the predicted model based of FIG. 9A.
Figure 9C:
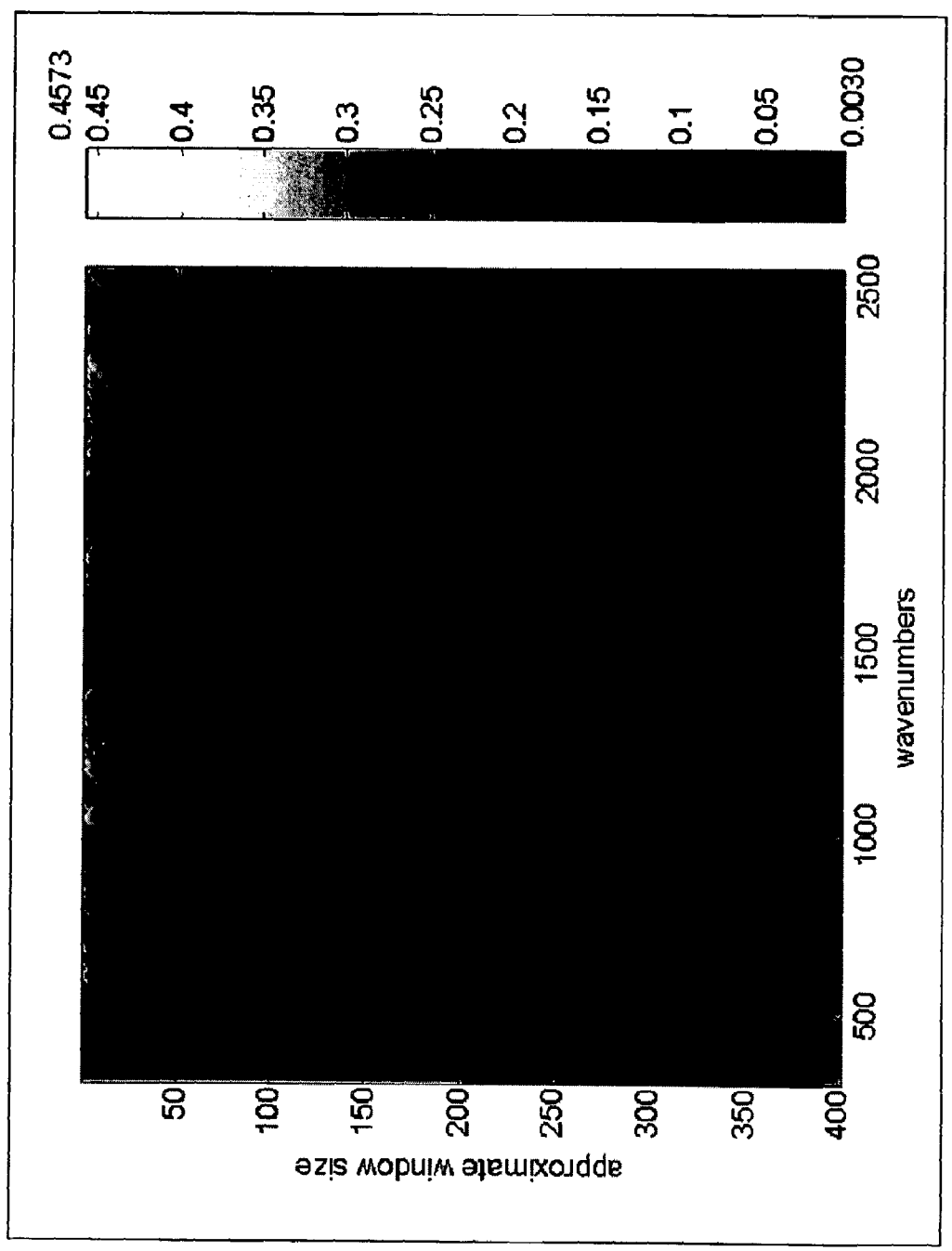
FIG. 9C is an image plot of the output resulting from CVA analysis of the residual segment of FIG. 9B.

FIG. 9A is a plot of a measured data set generated by the LISA system for an observed Raman Effect spectrum of ethanol on a rock 902. A best-fit predicted model 904 is plotted on top of the measured data set that was generated using a non-negative least squares algorithm based upon the stored library data sets for acetonitrile, air, ethanol, ethylene glycol, isopropanol, and a negative sloped line. FIG. 9B is a plot of the residual between the measured data set 902 and the predicted model 904. FIG. 9C is an image plot of the output resulting from CVA analysis of the residual segment of FIG. 9B.

Visual assessment of FIG. 9C reveals that the measures of variation calculated in accordance with the CVA process, described above, are relatively consistent across both smaller and larger sized windows. Based upon the relatively even shade of the image presented, it is apparent that for window sizes greater than approximately ten units that there no large changes in the measures of variation calculated for the residual data set. Therefore, by applying the CVA process to the residual data set the residual data set can be characterized as homoscedastic, indicating that any differences between the measured data set and the predicted model are due to random noise rather than due to contributions from sources that were not included in the predicted model.

Figure 10B:
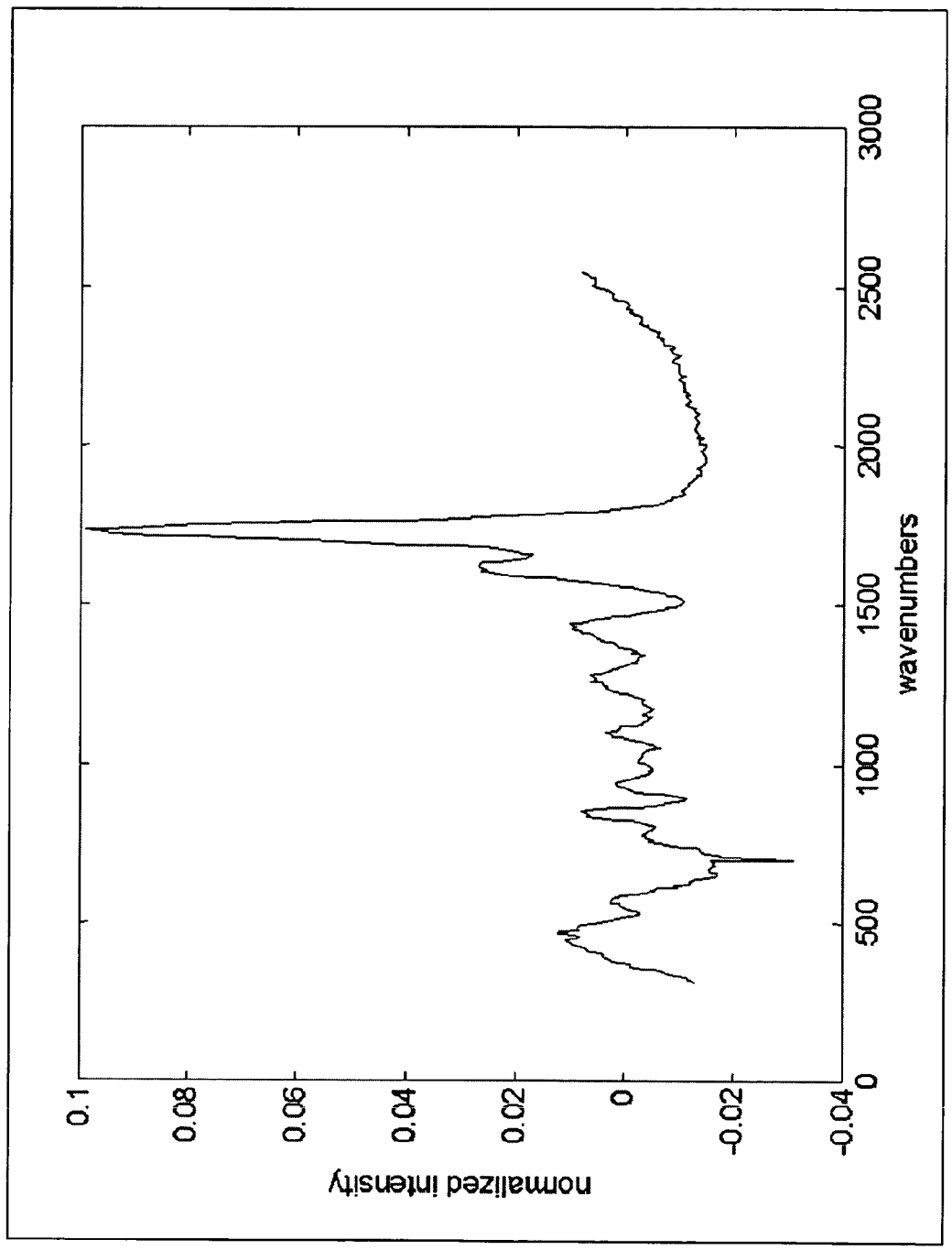
FIG. 10B is a plot of a residual between the observed spectrum and the predicted model based of FIG. 10A.
Figure 10C:
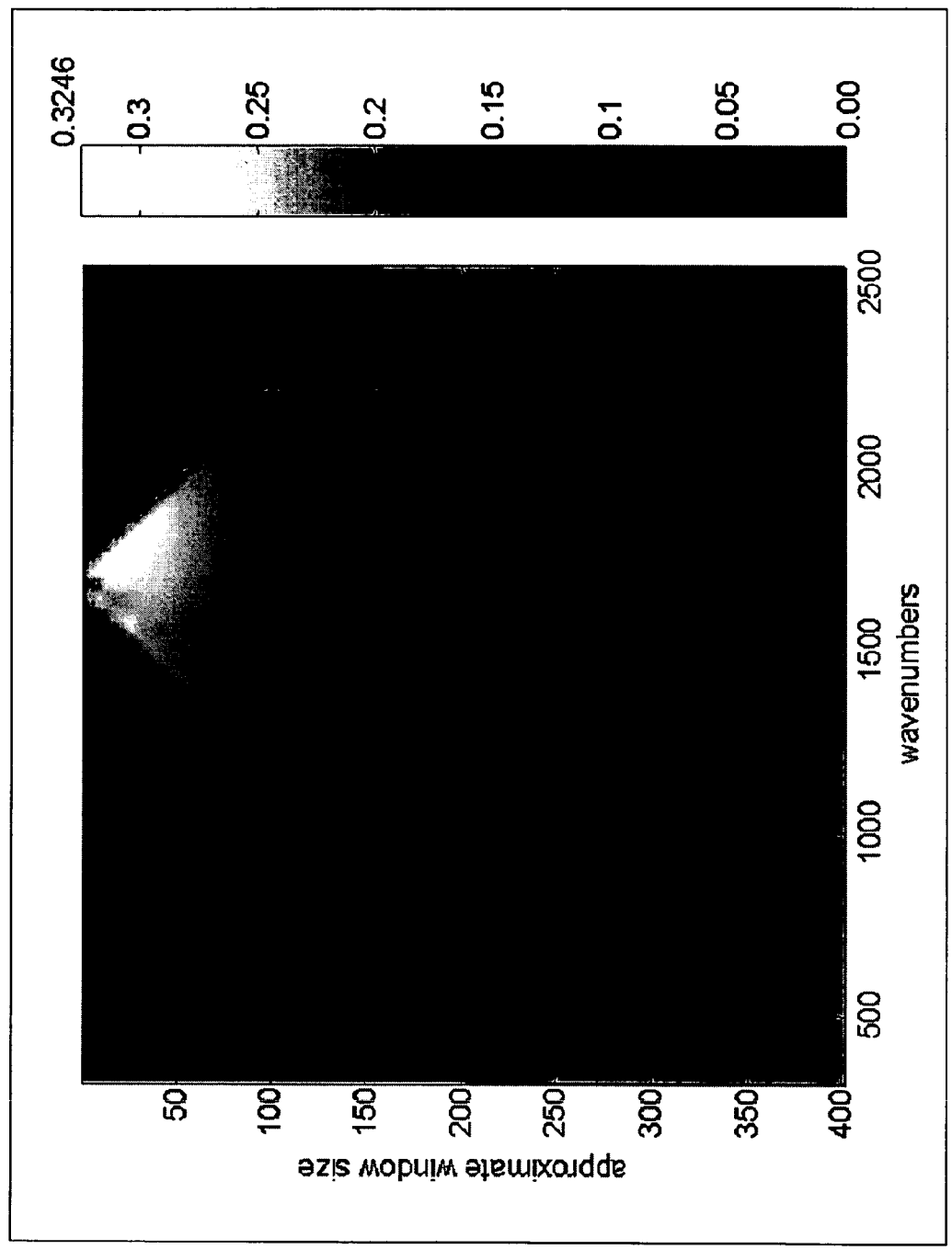
FIG. 10C is an image plot of the output resulting from CVA analysis of the residual segment of FIG. 10B.

FIG. 10A is a plot of a measured data set 1002 generated by the LISA system based upon one thousand measured Raman Effect spectra for Diethyl Malonate (DEM). A best-fit predicted model 1004 is plotted on top of the measured data set that was generated using a non-negative least squares algorithm based upon the stored library data sets for ethanol, isopropanol and water. Predicted model 1004 does not include data from a stored data set for DEM, because no such data set was included in the LISA system's library storage module. FIG. 10B is a plot of the residual between the measured data set 1002 and the predicted model 1004. FIG. 10C is an image plot of the output resulting from CVA analysis of the residual segment of FIG. 10B.

Visual assessment of FIG. 10C reveals that the measures of variation calculated in accordance with the CVA process, described above, are not consistent across both smaller and larger sized windows. Based upon the large contrast in the shades presented in FIG. 10C, it is apparent that there are large changes in the measures of variation calculated for the residual data set for window sizes larger than 200 units. Therefore, by applying the CVA process to the residual data set the residual data set can be characterized as heteroscedastic, indicating that differences between the measured data set and the predicted model are likely due to contribution by a non-random source not included in the predicted model. Such an assessment is accurate because, as we know, a model for DEM has not been included in the LISA systems data set storage module.

Figure 11B:
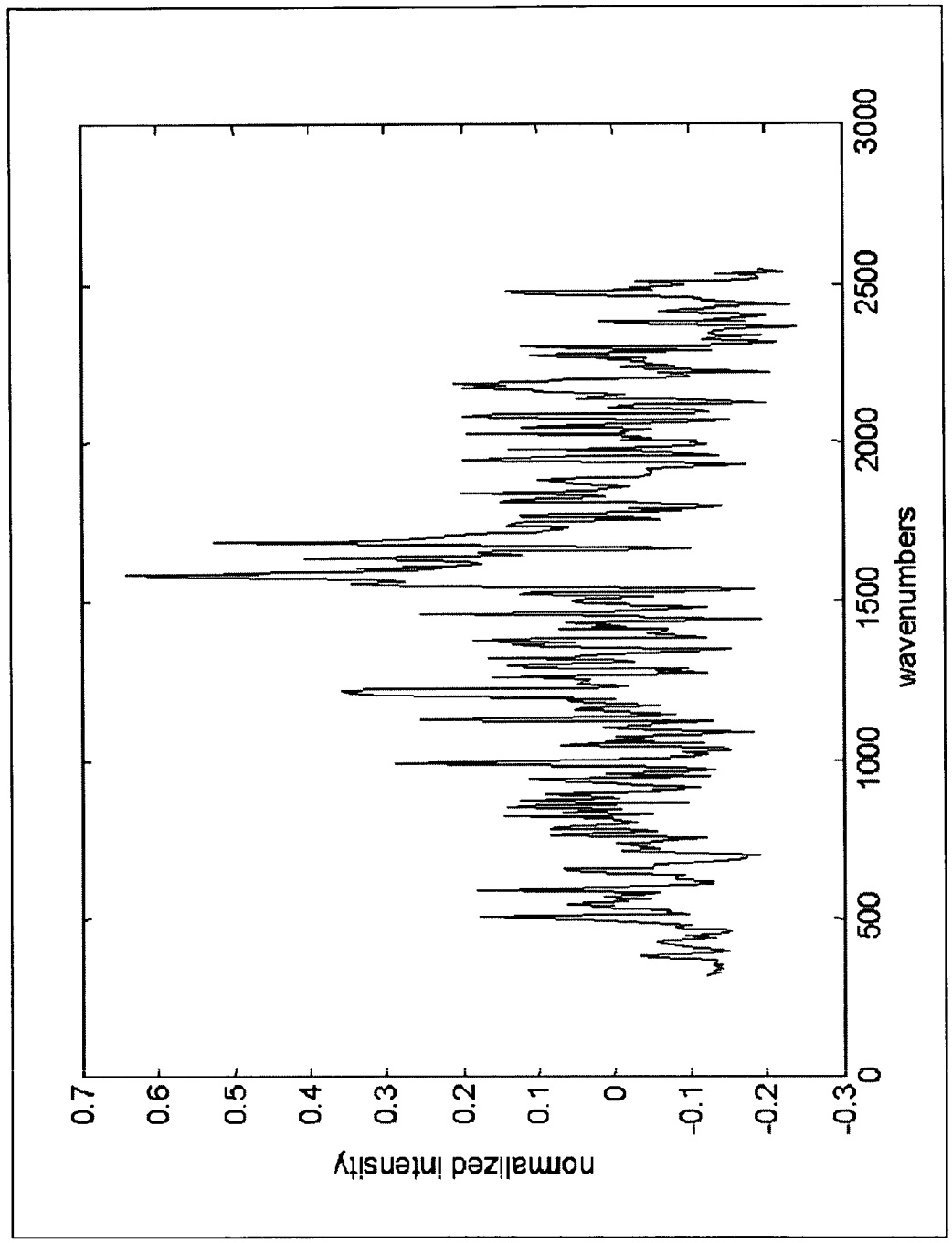
FIG. 11B is a plot of a residual between the observed spectrum and the predicted model based of FIG. 11A
Figure 11C:
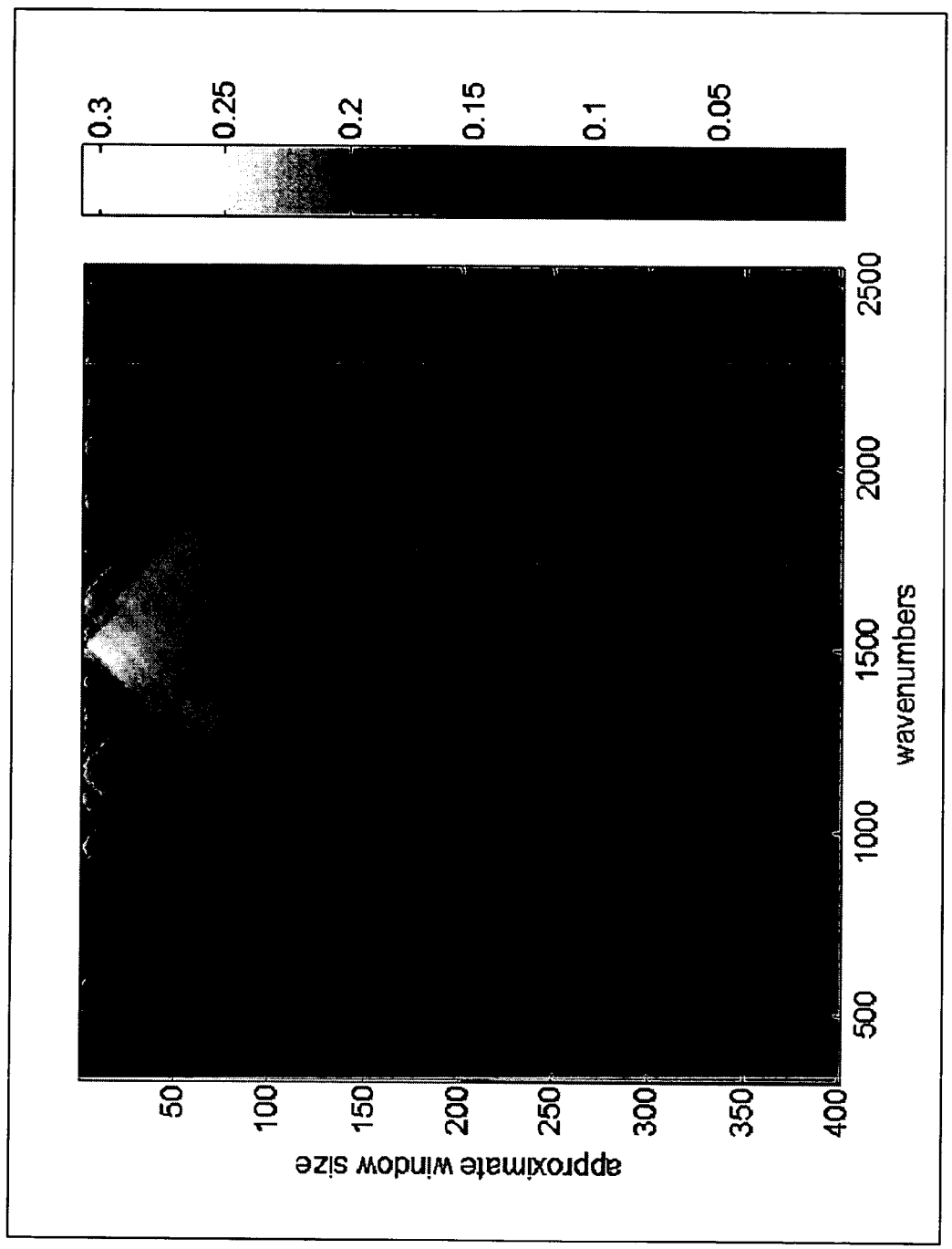
FIG. 11C is an image plot of the output resulting from CVA analysis of the segment of FIG. 11B.

FIG. 11A is a plot of a measured data set 1102 generated by the LISA system based upon one thousand measured Raman Effect spectra for Methyl Ethyl Salicylate (MES). A best-fit predicted model 1104 is plotted on top of the measured data set that was generated using a non-negative least squares algorithm based upon the stored library data sets for air, teflon and a negative sloped line. Predicted model 1104 does not include data from a stored data set for MES, because no such data set was included in the LISA system's library storage module. FIG. 11B is a plot of the residual between the measured data set 1102 and the predicted model 1104. FIG. 11C is an image plot of the output resulting from CVA analysis of the residual segment of FIG. 11B.

Visual assessment of FIG. 11C reveals that the measures of variation calculated in accordance with the CVA process, described above, are not consistent across both smaller and larger sized windows. Based upon the large contrast between the shades presented in FIG. 11C, it is apparent that there are large changes in the measures of variation calculated for the residual data set for window sizes larger than 200 units. Therefore, by applying the CVA process to the residual data set the residual data set can be characterized as heteroscedastic, indicating that differences between the measured data set and the predicted model are likely due to contribution by a non-random source not included in the predicted model. Such an assessment is accurate because, as we know, a model for MES has not been included in the LISA systems data set storage module.

Automated CVA analysis, as described above, is based upon numeric assessment of the generated CVA output, rather than visual assessment. Whether assessing the CVA output visually or numerically, the assessment process attempts to identify significant differences between the measures of variation calculated for contiguous segments (i.e., windows) of the residual data set. CVA generated output facilitates the visual and/or numeric detection of changes in the measures of variation within a data set by calculating measures of variation for different sized windows as each window is shifted across the data set. The magnitude of changes in the calculated measures of variation that trigger classification of a residual as heteroscedastic can be defined with respect to a maximum window size and a maximum difference. For example, in one representative application, a significant change in the measures of variation calculated for a residual data set using window sizes greater that 100, would indicate heteroscedastic characteristics. However, in other applications, a significant change in the measures of variation calculated for a residual data set using window sizes as small a 10 units, would indicate heteroscedastic characteristics. The magnitude of the difference in calculated measures of variation that would indicate heteroscedastic behavior can also vary. For example, in one representative application, a two-fold change in magnitude at window sizes above a pre-selected window size, as described above, would indicate heteroscedastic characteristics in the residual data set. However, in other applications, a ten-fold change in magnitude at window sizes above a pre-selected window size, as described above, would indicate heteroscedastic characteristics in the residual data set. Typically whether a visual assessment or numeric assessment of CVA output is performed, a window size parameter (e.g., max_win_size)/change in measure of variation parameter (e.g., max_variation) combination is used to assess the CVA output. If during visual or numeric assessment of the CVA output a change in measure of variation greater than max_variation is detected across a set of measures of variation calculated for windows of size greater than max_variation, the residual data set is classified as heteroscedastic. Otherwise, the data set is characterized as homoscedastic.

Depending upon the nature of the system in which CVA is applied, the nature of the measured data set, and the type of measure of variation used, the threshold values assigned to max_win_size and max_variation can vary, as described above. In embodiments in which the measure of variation used is a standard deviation, a general rule of thumb, however, if the maximum point in the CVA matrix is greater than two times to ten times the standard deviation of the entire residual, there is a high likelihood of an unknown agent. Likewise, if the maximum point in the CVA matrix is less than two times to ten times the standard deviation of the entire residual, there is a high likelihood of high noise. Further, as a third rule of thumb, if prior to performing CVA it is determined that the percent variance captured is less than 50%, there is a high likelihood of an unknown agent. While the first two rules of thumb (i.e., with respect to max_win_size and max_variation) are mutually exclusive, the third rule of thumb allows for identification of an unknown in a noisy spectrum, based on the assumption that noise alone will not degrade the percent variance captured to 50%.

Automated analysis of CVA output can also include other numeric analysis techniques, such as N-way Principal Component Analysis (n-PCA). Using N-PCA, CVA output is analyzed and compared with the n-PCA results of previously assessed CVA output associated with data sets with known characteristics. N-PCA results for CVA output generated for data sets with similar characteristics (e.g., good predicted model, poor predicted model, noisy, low-noise) tend to cluster in factor space. For example, N-PCA of CVA output for a data set based upon a poor predicted model and high noise will cluster in factor space with the results of N-PCA of CVA output for other data sets based upon a poor predicted model and high noise. N-PCA of CVA output for a data set based upon a poor predicted model and low noise will cluster in factor space with the results of N-PCA of CVA output for other data sets based upon a poor predicted model and low noise. N-PCA of CVA output for a data set based upon a good predicted model and high noise will cluster in factor space with the results of N-PCA of CVA output for other data sets based upon a good predicted model and high noise. Finally, N-PCA of CVA output for a data set based upon a good predicted model and low noise will cluster in factor space with the results of N-PCA of CVA output for other data sets based upon a good predicted model and low noise. In this manner, CVA output can be attributed the characteristics of the factor space cluster with which the CVA output is grouped as a result of n-PCA.

Using a CVA enabled apparatus and methods described here, a measured data set with a high noise to signal ratio is compared with a predicted model to produce a residual data set that is then characterized as either homoscedastic or heteroscedastic. The measured data set typically contains measurements based upon an observed natural and/or man-made phenomenon and/or a received signal generated by a natural and/or man-made transmitter source. The predicted model, with which the measured data set is compared, typically includes one or more stored data sets that are associated with known components. If the residual noise is found to be homoscedastic, the deviations in the predicted model from the measured data set are random in nature and confidence in the predicted model is improved. If the residual noise is found to be heteroscedastic, the predicted model has failed to capture a significant non-random contributing/interfering source contributing to the measured data set.

CVA can be used to characterize a data set associated with any signal as either homoscedastic or heterscedastic. Further, CVA capability is compatible with any apparatus/approach that uses numerical analysis techniques, such as multiple linear regression (MLR), classical least squares (CLS), and any other linear and nonlinear techniques to generate a predicted model based upon stored library components and/or mathematical models. CVA is compatible with any programming language and can be readily added to new and/or existing apparatus to compliment existing statistical analysis of residual data sets and/or independent data sets. CVA is less complex than conventional residual analysis techniques and, therefore, requires less computer processing capacity than conventional techniques. CVA generates output that can be easily interpreted, visually by a technician and/or numerically by an automatic numerical analysis tool.

It will be appreciated that the embodiments described above and illustrated in the drawings represent only a few of the many ways of implementing and applying CVA. The present invention is not limited to the specific applications disclosed herein, but may be used to improve confidence in data sets associated with any information collection and/or signal processing device that generates a data set containing a high signal to noise ratio.

The CVA process can be implemented in any number of modules and is not limited to the software module architecture described above. Each module can be implemented in any number of ways and are not limited in implementation to execute process flows precisely as described above. The CVA processes described above and illustrated in the flow charts and diagrams may be modified in any manner that accomplishes the functions described herein. For example, window sizes used for calculating CVA output can be increased from a minimum window size to a maximum window size, or decreased form a maximum window size to a minimum window size, using increments of any size. Windows can be centered upon an identified data element, I, as described above, or oriented with respect to I in any manner that results in a shifting of a window size across the residual data. Windows can be stepped across the residual data set in any manner such as from lowest to highest residual data set element, from highest to lowest residual data set element, in unitary data element increments and/or multiple data element increments. CVA output can be generated (i.e., measures of variation can be determined) for a continuous range of windows sizes, from very small to very large. Window size increments are not limited to any minimum increment size nor are increments in window size limited to whole units of increment, regardless of increment size. In one embodiment, CVA includes a continuous range of window sizes, with each window shifted across the data set in near continuous increments.

It is to be understood that various functions of the CVA method and apparatus may be distributed in any manner among any quantity (e.g., one or more) of hardware and/or software modules or units, computer or processing systems or circuitry.

CVA processing module(s) may be integrated within a stand-alone system or may execute separately and be coupled to any number of devices, workstation computers, server computers or data storage devices via any communications medium (e.g., network, modem, direct connection, etc.). The CVA process can be implemented by any quantity of devices and/or any quantity of personal or other type of devices computer or processing system (e.g., IBM-compatible, Apple, Macintosh, laptop, palm pilot, microprocessor, etc.). The computer system may include any commercially available operating system (e.g., Windows, OS/2, Unix, Linux, DOS, etc.), any commercially available and/or custom software (e.g., communications software, CVA process software, etc.) and any types of input devices (e.g., keyboard, mouse, microphone, I/O port, radio receiver, Raman Effect measurement module, etc.).

It is to be understood that the software of the CVA process may be implemented in any desired computer language, and could be developed by one of ordinary skill in the computer and/or programming arts based on the functional description contained herein and the flow charts illustrated in the drawings. For example, in one embodiment the CVA process can be written using the C+ programming language, however, the present invention is not limited to being implemented in any specific programming language. The various modules and data sets may be stored in any quantity or types of file, data or database structures. Moreover, the CVA software may be available or distributed via any suitable medium (e.g., stored on devices such as CD-ROM and diskette, downloaded from the Internet or other network (e.g., via packets and/or carrier signals), downloaded from a bulletin board (e.g., via carrier signals), or other conventional distribution mechanisms).

Loop counters, flags and control variables can change in number, type and manner of use, initialized/final values, size of incremental adjustments. Control parameters can control/monitor loop execution in ascending, descending and/or another appropriate or orderly manner. The format and structure of internal structures used to hold intermediate information in support of the CVA process can include any and all structures and fields an are not limited to files, arrays, matrices, status and control booleans/variables.

The CVA software may be installed and executed on a computer system in any conventional or other manner (e.g., an install program, copying files, entering an execute command, etc.). The functions associated with a system that uses CVA (e.g., creation of a measured data set, creation of a best fit predicted model, creation of a residual data set, CVA analysis, visual/numeric analysis of CVA results, etc.) may be performed on any quantity of computers or other processing systems. Further, the specific functions may be assigned to one or more of the computer systems in any desired fashion.

The CVA process may accommodate any quantity and any type of data set files and/or databases or other structures containing stored data sets, measured data sets and/or residual data sets in any desired format (e.g., ASCII, plain text, any word processor or other application format, etc.).

The CVA process can be applied to any set of values to assess the degree of variation within the set of values. A set of values can include a set of measured values (e.g., a measured data set), a set of residual values (e.g., a residual data set), or any set of values base upon one or more signals or events. Regardless of the nature or origin of the set of values assessed, the CVA process output provides a basis by which to visually or numerically assess and to categorize the degree of differences in the measures of variation selected for the data set.

CVA output can be presented to the user in any manner using numeric and/or visual presentation formats. CVA output can be presented as input to a numerical analysis tool in either numeric or visual form and can be processed by the numerical analysis tool in any manner and/or using any number of threshold values and/or rule sets. For example, a technician can visually interpret CVA results via direct inspection the CVA numeric output, inspection of an image plot of CVA numeric output, or inspection of output from a numerical analyzer that has further numerically processed the CVA output.

Further, any references herein of software performing various functions generally refer to computer systems or processors performing those functions under software control. The computer system may alternatively be implemented by hardware or other processing circuitry. The various functions of the CVA process may be distributed in any manner among any quantity (e.g., one or more) of hardware and/or software modules or units, computer or processing systems or circuitry, where the computer or processing systems may be disposed locally or remotely of each other and communicate via any suitable communications medium (e.g., LAN, WAN, Intranet, Internet, hardwire, modem connection, wireless, etc.). The software and/or processes described above and illustrated in the flow charts and diagrams may be modified in any manner that accomplishes the functions described herein.

From the foregoing description it will be appreciated that the present invention includes a novel continuous measure of variation analysis system and method that is capable of increasing confidence in measured data sets with a high noise to signal ratio by building a predicted model, generating a residual data set, and characterizing the residual data set based upon assessment of measures of variation.

Having described preferred embodiments of a CVA system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of analyzing a set of values, comprising:
    (a) defining a plurality of subsets of contiguous values within a set of values comprising residual values that represent a difference between data element values of a predicted model data set and data element values of a measured data set;
    (b) determining a measure of variation among contiguous values in each of the plurality of subsets to produce a plurality of measures of variation corresponding to the plurality of subsets; and
    (c) categorizing the set of values based upon an analysis of the plurality of measures of variation.

2. The method of claim 1, wherein the set of values are values measured from a communication signal.

3. The method of claim 1, wherein the set of values are values measured from one of an observed substance and an observed event.

4. The method of claim 1, wherein the residual values are the result of numerical analysis of a communication signal.

5. The method of claim 1, wherein the residual values are the result of numerical analysis of values associated with one of an observed substance and an observed event.

6. The method of claim 1, wherein (c) comprises characterizing the set of values as one of homoscedastic and heteroscedastic.

7. The method of claim 1, wherein (a) further comprises:
    (a.1) defining a range of values not greater than a number of values within the set of values; and
    (a.2) defining a subset of values by positioning the range at a specific position within the set of values.

8. The method of claim 7, wherein (a) further includes:
    (a.3) varying the size of the range for a plurality of the subsets.

9. The method of claim 7, wherein (a) further includes:
    (a.3) varying the position of the range within the set of values for a plurality of the subsets.

10. The method of claim 7, wherein (a) further includes:
    (a.3) varying the size of the range for a plurality of the subsets; and
    (a.4) varying the position of the range within the set of values for a plurality of the subsets.

11. The method of claim 1, wherein (b) further comprises:
    (b.1) storing the determined measure of variation.

12. The method of claim 11, wherein (b.1) further comprises:
    (b.1.1) storing a determined measure of variation in association with a size of the range and a position of the range associated with the subset for which the measure of variation was determined.

13. The method of claim 1, wherein (c) further comprises:
    (c.1) categorizing the set of values based upon a difference between a measure of variation determined for one of the plurality of subsets and a measure of variation determined for another one of the plurality of subsets.

14. The method of claim 1, wherein (c) further comprises:
(c.1) categorizing the set of values based upon n-way principal component analysis of the measures of variation determined for the plurality of subsets.

15. The method of claim 1, wherein (c) further comprises:
(c.1) categorizing the set of values based upon visual analysis of a plot of the measures of variation determined for the plurality of subsets.

16. The method of claim 15, wherein the visual analysis is based upon patterns within one of a two-dimensional plot and a three-dimensional plot of the measures of variation determined for the plurality of subsets.

17. The method of claim 15, wherein a position of a measure of variation within the plot is based upon a size of the subset and a position of the subset for which the measure of variation was determined.

18. An apparatus for analyzing a set of values, comprising:
(a) a measurement module that produces a set of values comprising residual values that represent a difference between data element values of a predicted model data set and data element values of a measured data set;
(b) a windowing module that defines a plurality of subsets of contiguous values within the set of values;
(c) an analysis module that determines a measure of variation among contiguous values in each of the plurality of subsets to produce a plurality of measures of variation corresponding to the plurality of subsets; and
(d) an assessment module that categorizes the set of values based upon an analysis of the plurality of measures of variation.

19. The apparatus of claim 18, wherein the measurement module produces the measurement values measured from a communication signal.

20. The apparatus of claim 18, wherein the measurement module produces the measurement values measured from one of an observed substance and an observed event.

21. The apparatus of claim 18, wherein the measurement module produces the residual values as a result of numerical analysis of a communication signal.

22. The apparatus of claim 18, wherein the measurement module produces the residual values as a result of numerical analysis of values associated with one of an observed substance and an observed event.

23. The apparatus of claim 18, wherein the assessment module characterizes the set of values as one of homoscedastic and heteroscedastic.

24. The apparatus of claim 18, wherein the windowing module defines a range of values not greater than a number of values within the set of values.

25. The apparatus of claim 18, wherein the windowing module defines a subset of values by positioning the range at a specific position within the set of values.

26. The apparatus of claim 24, wherein the windowing module further varies the size of the range for a plurality of the subsets.

27. The apparatus of claim 25, wherein the windowing module varies the position of the range within the set of values for a plurality of the subsets.

28. The apparatus of claim 18, wherein the analysis module stores the determined measure of variation.

29. The apparatus of claim 28, wherein the analysis module stores a determined measure of variation in association with the size of the range and the position of the range associated with the subset for which the measure of variation was determined.

30. The apparatus of claim 18, wherein the assessment module categorizes the set of values based upon a difference between a measure of variation determined for one of the plurality of subsets and a measure of variation determined for another one of the plurality of subsets.

31. The apparatus of claim 18, wherein the assessment module categorizes the set of values based upon n-way principal component analysis of the measures of variation determined for the plurality of subsets.

32. The apparatus of claim 18, wherein the assessment module categorizes the set of values based upon visual analysis of a plot of the measures of variation determined for the plurality of subsets.

33. The apparatus of claim 32, wherein the visual analysis is based upon patterns within one of a two-dimensional plot and a three-dimensional plot of the measures of variation determined for the plurality of subsets.

34. The apparatus of claim 32, wherein a position of a measure of variation within the plot is based upon a size of the subset and a position of the subset for which the measure of variation was determined.

35. A program product apparatus having a computer readable medium with computer program logic recorded thereon for analyzing a set of values, said program product apparatus comprising:
(a) a measurement module that produces a set of values comprising residual values that represent a difference between data element values of a predicted model data set and data element values of a measured data set;
(b) a windowing module that defines a plurality of subsets of contiguous values within the set of values;
(c) an analysis module that determines a measure of variation among contiguous values in each of the plurality of subsets to produce a plurality of measures of variation corresponding to the plurality of subsets; and
(d) an assessment module that categorizes the set of values based upon an analysis of the plurality of measures of variation.

36. The program product apparatus of claim 35, wherein the assessment module characterizes the set of values as one of homoscedastic and heteroscedastic.

37. The program product apparatus of claim 35, wherein the assessment module categorizes the set of values based upon a difference between a measure of variation determined for one of the plurality of subsets and a measure of variation determined for another one of the plurality of subsets.

38. The program product apparatus of claim 35, wherein the assessment module categorizes the set of values based upon n-way principal component analysis of the measures of variation determined for the plurality of subsets.

39. The program product apparatus of claim 35, wherein the assessment module categorizes the set of values based upon visual analysis of a plot of the measures of variation determined for the plurality of subsets.

40. An apparatus for analyzing a set of values, comprising:
(a) means for producing a set of values comprising residual values that represent a difference between data element values of a predicted model data set and data element values of a measured data set;
(b) means for defining a plurality of subsets of contiguous values within the set of values;

(c) means for determining a measure of variation among contiguous values in each of the plurality of subsets to produce a plurality of measures of variation corresponding to the plurality of subsets; and (d) means for categorizing the set of values based upon an analysis of the plurality of measures of variation.

41. The apparatus of claim 40, wherein said (c) means for categorizing characterizes the set of values as one of homoscedastic and heteroscedastic.

42. The apparatus of claim 40, wherein said (c) means for categorizing further comprises:

(c.1) means for categorizing the set of values based upon a difference between a measure of variation determined for one of the plurality of subsets and a measure of variation determined for another one of the plurality of subsets.

\* \* \* \* \*